US012440010B2

(12) United States Patent
Tran et al.

(10) Patent No.: US 12,440,010 B2
(45) **Date of Patent: *Oct. 14, 2025**

(54) WALLET

(71) Applicant: CTB HOLDINGS LLC, Portola Valley, CA (US)

(72) Inventors: Thuan Tran, San Jose, CA (US); Charlie Carroll, Palo Alto, CA (US); Binh Tran, Santa Clara, CA (US)

(73) Assignee: CTB HOLDINGS LLC, Portola Valley, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 18/471,061

(22) Filed: Sep. 20, 2023

(65) Prior Publication Data

US 2024/0008609 A1 Jan. 11, 2024

Related U.S. Application Data

(63) Continuation of application No. 17/887,350, filed on Aug. 12, 2022, now Pat. No. 11,786,018, which is a (Continued)

(51) Int. Cl.

| | |
|---|---|
| ***A45C 1/06*** | (2006.01) |
| ***B25F 1/00*** | (2006.01) |
| ***B25F 5/02*** | (2006.01) |

(52) U.S. Cl.

CPC ................ *A45C 1/06* (2013.01); *B25F 1/006* (2013.01); *B25F 5/029* (2013.01); (Continued)

(58) Field of Classification Search

CPC ... B25F 5/029; A45C 2001/065; A45C 11/182

See application file for complete search history.

(56) References Cited

U.S. PATENT DOCUMENTS

| | | | |
|---|---|---|---|
| 1,415,276 | A | 5/1922 | Edward |
| 1,463,619 | A | 7/1923 | Gardner |

(Continued)

FOREIGN PATENT DOCUMENTS

| | | | |
|---|---|---|---|
| CA | 2471793 | C | 6/2003 |
| CN | 305992507 | | 8/2020 |

(Continued)

OTHER PUBLICATIONS

Dango Products—"Wallet Collections"—Available from Internet <URL: www.dangoproducts.com/collections/wallets>—Available at least as of Oct. 19, 2017—Retrieved from Internet Archive Wayback Machine <URL: https://web.archive.org/web/20171019082039/www.dangoproducts.com/collections/wallets> on Oct. 23, 2020.

(Continued)

*Primary Examiner* — Nathan J Jenness
*Assistant Examiner* — Justin Caudill
(74) *Attorney, Agent, or Firm* — Gallium Law; Jacob Panangat; Isabel Fox

(57) ABSTRACT

A wallet includes a first metal shell with one or more openings on a shell perimeter adapted to clip one or more objects to the one or more openings; a second metal shell coupled to the first shell with a storage compartment therebetween; and securing a soft material to the first and second metal shells, wherein the soft material comprises compartment to store cards or money therein.

20 Claims, 19 Drawing Sheets

Related U.S. Application Data continuation of application No. 16/250,310, filed on Jan. 17, 2019, now Pat. No. 11,439,214.

(52) U.S. Cl.
CPC .. *A45C 2001/062* (2013.01); *A45C 2001/065* (2013.01); *A45C 2001/067* (2013.01)

(56) References Cited

U.S. PATENT DOCUMENTS

| | | | | | |
|---|---|---|---|---|---|
| 1,585,051 | A | | 5/1926 | Skoglund | |
| 1,670,343 | A | | 5/1928 | Clemens | |
| 1,832,625 | A | | 11/1931 | Gardner | |
| 1,908,115 | A | | 5/1933 | Chadwick | |
| 2,288,704 | A | | 7/1942 | Herbner | |
| 2,511,533 | A | | 6/1950 | Sindey | |
| 2,802,500 | A | * | 8/1957 | June | A45C 1/08 150/144 |
| D187,240 | S | | 2/1960 | Harkins | |
| 3,461,469 | A | | 8/1969 | Morrision | |
| D256,852 | S | | 9/1980 | McGahee | |
| 4,305,497 | A | | 12/1981 | Pacilio | |
| D266,479 | S | | 10/1982 | Hayakawa | |
| 4,691,456 | A | | 9/1987 | Ackeret | |
| 4,705,086 | A | | 11/1987 | O'Neill | |
| 4,763,821 | A | | 8/1988 | Powell | |
| 4,774,779 | A | | 10/1988 | Ackeret | |
| 4,932,520 | A | | 6/1990 | Ciarcia | |
| D314,865 | S | | 2/1991 | Tuisku | |
| 5,038,926 | A | | 8/1991 | Van Der Toorn | |
| D322,039 | S | | 12/1991 | Chien | |
| 5,077,869 | A | | 1/1992 | Haase | |
| D337,656 | S | | 7/1993 | Hostert | |
| 5,234,351 | A | | 8/1993 | Dixon | |
| 5,279,019 | A | | 1/1994 | Knickle | |
| 5,328,026 | A | | 7/1994 | Newman | |
| D360,815 | S | | 8/1995 | Padden | |
| D366,146 | S | | 1/1996 | Bertrand | |
| D374,388 | S | | 10/1996 | Padden | |
| 5,573,164 | A | | 11/1996 | Law | |
| 5,592,767 | A | | 1/1997 | Treske | |
| D384,499 | S | | 10/1997 | Gaestel | |
| 5,718,329 | A | * | 2/1998 | Ippolito | A45C 11/182 150/147 |
| 5,740,624 | A | | 4/1998 | Baseley | |
| D398,446 | S | | 9/1998 | Hosea | |
| D404,567 | S | | 1/1999 | Akutsu | |
| 5,901,764 | A | | 5/1999 | Ritter | |
| D411,766 | S | | 7/1999 | Elkington | |
| 5,929,427 | A | | 7/1999 | Harada | |
| 5,944,080 | A | * | 8/1999 | Podwika | A45C 11/182 150/147 |
| D416,581 | S | | 11/1999 | Cheng | |
| 6,009,584 | A | | 1/2000 | Padden | |
| 6,044,967 | A | | 4/2000 | Painsith | |
| 6,076,665 | A | | 6/2000 | Chuang | |
| 6,089,289 | A | | 7/2000 | Florjancic | |
| D431,105 | S | | 9/2000 | Ling | |
| D431,719 | S | | 10/2000 | Mucarquer | |
| 6,145,994 | A | | 11/2000 | Ng | |
| D434,624 | S | | 12/2000 | Padden | |
| 6,155,410 | A | * | 12/2000 | Davis | A45C 11/182 150/147 |
| D444,060 | S | | 6/2001 | Elsener | |
| 6,276,414 | B1 | | 8/2001 | Bibb | |
| D447,438 | S | | 9/2001 | DiLibero | |
| 6,347,875 | B1 | | 2/2002 | Painsith | |
| D462,000 | S | | 8/2002 | Hightower | |
| 6,427,837 | B1 | | 8/2002 | Shields | |
| 6,460,698 | B1 | | 10/2002 | Wang | |
| 6,823,910 | B1 | | 11/2004 | Elnekaveh | |
| 6,851,147 | B2 | | 2/2005 | Abrahall | |
| D517,390 | S | | 3/2006 | Cheng | |
| D525,162 | S | | 7/2006 | Suman | |
| 7,334,616 | B2 | | 2/2008 | Kaminski | |
| D575,506 | S | | 8/2008 | Huang | |
| 7,546,860 | B1 | | 6/2009 | Mehdizadeh | |
| 7,556,073 | B2 | | 7/2009 | Lyons | |
| 7,568,250 | B2 | | 8/2009 | Menard-Flanagan | |
| 7,604,028 | B2 | | 10/2009 | Bridgefarmer | |
| 7,617,928 | B1 | | 11/2009 | Murphy | |
| D632,695 | S | | 2/2011 | Berntsen | |
| 7,918,335 | B1 | | 4/2011 | Kitchen | |
| 7,921,890 | B2 | | 4/2011 | Ho | |
| 7,928,335 | B2 | | 4/2011 | Kitchen | |
| D637,648 | S | | 5/2011 | Ringl | |
| 7,971,324 | B2 | | 7/2011 | Preston-Hall | |
| 8,047,363 | B2 | | 11/2011 | Sheba | |
| 8,251,210 | B2 | | 8/2012 | Schmidt | |
| D685,990 | S | | 7/2013 | Zhang | |
| D690,931 | S | | 10/2013 | Minn | |
| 8,567,459 | B2 | | 10/2013 | Kitchen | |
| 8,567,460 | B1 | | 10/2013 | Lentsch | |
| D695,013 | S | | 12/2013 | Minn | |
| D701,043 | S | | 3/2014 | Minn | |
| 8,726,952 | B2 | | 5/2014 | Jambunathan | |
| D706,271 | S | | 6/2014 | Gelsomini | |
| D707,091 | S | | 6/2014 | Barr | |
| 8,763,795 | B1 | | 7/2014 | Oten | |
| 8,776,846 | B1 | | 7/2014 | Thompson | |
| D716,043 | S | | 10/2014 | Wilk | |
| 8,863,793 | B2 | | 10/2014 | Black | |
| D718,525 | S | | 12/2014 | Kim | |
| D719,350 | S | | 12/2014 | Daoura | |
| 8,899,411 | B2 | | 12/2014 | Van Geer | |
| 9,125,464 | B2 | | 9/2015 | Minn | |
| 9,125,465 | B2 | | 9/2015 | Beckley | |
| D743,760 | S | | 11/2015 | Barr | |
| D745,274 | S | | 12/2015 | Minn | |
| D750,888 | S | | 3/2016 | Johnson | |
| D751,877 | S | | 3/2016 | Shlaferman | |
| D755,764 | S | | 5/2016 | Dong | |
| 9,339,094 | B2 | | 5/2016 | Tucker-Skow | |
| D765,487 | S | | 9/2016 | Barr | |
| D768,382 | S | | 10/2016 | Wu | |
| D768,383 | S | | 10/2016 | Wu | |
| D770,775 | S | | 11/2016 | Robertson | |
| D772,678 | S | | 11/2016 | Haarburger | |
| D775,824 | S | | 1/2017 | King | |
| D780,449 | S | | 3/2017 | King | |
| 9,615,641 | B2 | | 4/2017 | Yeung | |
| 9,648,931 | B2 | | 5/2017 | Sha | |
| 9,661,908 | B2 | | 5/2017 | Mayer | |
| D792,749 | S | | 7/2017 | Faro | |
| D798,591 | S | | 10/2017 | King | |
| D799,301 | S | | 10/2017 | Cetera | |
| 9,775,328 | B1 | | 10/2017 | Fidrych | |
| 9,815,212 | B2 | | 11/2017 | Barr | |
| D805,770 | S | | 12/2017 | Justiss | |
| D805,873 | S | | 12/2017 | Cetera | |
| D806,386 | S | | 1/2018 | King | |
| D808,158 | S | | 1/2018 | King | |
| D808,765 | S | | 1/2018 | Kisling | |
| D809,792 | S | | 2/2018 | Moon | |
| 9,907,375 | B1 | | 3/2018 | Kitchen | |
| D814,182 | S | | 4/2018 | Haarburger | |
| D814,183 | S | | 4/2018 | Haarburger | |
| D815,932 | S | | 4/2018 | Lee | |
| D815,935 | S | | 4/2018 | Barak | |
| D817,196 | S | | 5/2018 | Haarburger | |
| D817,316 | S | | 5/2018 | Srour | |
| D818,708 | S | | 5/2018 | An | |
| D827,408 | S | | 9/2018 | Stefanczyk-Lacor | |
| D828,023 | S | | 9/2018 | Serman | |
| D828,024 | S | | 9/2018 | Serman | |
| D828,025 | S | | 9/2018 | Serman | |
| 10,080,409 | B2 | | 9/2018 | King | |
| D831,349 | S | | 10/2018 | Deng | |
| 10,123,596 | B2 | | 11/2018 | King | |
| D835,408 | S | | 12/2018 | Justiss | |
| D835,409 | S | | 12/2018 | Justiss | |
| D835,410 | S | | 12/2018 | Chan | |
| D836,335 | S | | 12/2018 | Serman | |
| D836,336 | S | | 12/2018 | Serman | |

(56) References Cited

U.S. PATENT DOCUMENTS

| | | | | |
|---|---|---|---|---|
| D836,914 | S | 1/2019 | Reinhart | |
| 10,201,216 | B2 | 2/2019 | Van Geer | |
| 10,206,473 | B2 | 2/2019 | Haarburger | |
| D842,070 | S | 3/2019 | Kisling | |
| D845,623 | S | 4/2019 | Sullivan | |
| 10,327,525 | B2 * | 6/2019 | Deng | A45F 5/021 |
| D856,956 | S | 8/2019 | Liu | |
| 10,368,618 | B2 | 8/2019 | Richards | |
| D858,984 | S | 9/2019 | Zucco | |
| D860,645 | S | 9/2019 | Wu | |
| D861,339 | S | 10/2019 | Moon | |
| D866,177 | S | 11/2019 | Leh | |
| D866,178 | S | 11/2019 | Jin | |
| D866,276 | S | 11/2019 | Shlaferman | |
| D866,964 | S | 11/2019 | Tran | |
| D868,463 | S | 12/2019 | Tran | |
| D869,843 | S | 12/2019 | Zhou | |
| 10,512,316 | B2 | 12/2019 | Haarburger | |
| D875,490 | S | 2/2020 | Barr | |
| D877,513 | S | 3/2020 | Duncan | |
| D877,594 | S | 3/2020 | Liang | |
| D878,891 | S | 3/2020 | Polczynski | |
| D878,893 | S | 3/2020 | Kao | |
| D879,580 | S | 3/2020 | Spater | |
| 10,595,611 | B2 | 3/2020 | Berkley | |
| D881,671 | S | 4/2020 | Kao | |
| D884,338 | S | 5/2020 | Liu | |
| D884,339 | S | 5/2020 | Li | |
| D884,792 | S | 5/2020 | Swallow | |
| D887,708 | S | 6/2020 | Tran | |
| D887,709 | S | 6/2020 | Fenton | |
| D890,525 | S | 7/2020 | Leh | |
| D891,101 | S | 7/2020 | Lv | |
| D891,767 | S | 8/2020 | Lamb | |
| D893,975 | S | 8/2020 | Tran | |
| D895,276 | S | 9/2020 | Leh | |
| D895,961 | S | 9/2020 | Swan | |
| D895,963 | S | 9/2020 | Anderson | |
| D896,506 | S | 9/2020 | Anderson | |
| 10,791,808 | B2 | 10/2020 | Kane | |
| D904,016 | S | 12/2020 | Jacobsen | |
| D904,143 | S | 12/2020 | Hollinger | |
| D908,351 | S * | 1/2021 | Hoffman | D3/247 |
| D908,352 | S | 1/2021 | Pirker | |
| D909,059 | S | 2/2021 | Leh | |
| D915,066 | S | 4/2021 | Blackrock | |
| D915,765 | S | 4/2021 | Quittner | |
| D917,879 | S | 5/2021 | Chui | |
| D918,002 | S | 5/2021 | Borenstein | |
| D930,634 | S | 9/2021 | Azodi | |
| D930,981 | S | 9/2021 | Ghazzaoui | |
| D932,182 | S | 10/2021 | Foy | |
| D933,360 | S | 10/2021 | Qing | |
| D934,560 | S | 11/2021 | Tran | |
| 11,178,947 | B2 | 11/2021 | Tran | |
| 11,284,689 | B1 | 3/2022 | Duncan | |
| 11,311,087 | B2 | 4/2022 | Del Moral | |
| D950,240 | S | 5/2022 | Tran | |
| D950,241 | S | 5/2022 | Tran | |
| D951,632 | S | 5/2022 | Tran | |
| 11,337,498 | B2 | 5/2022 | Tran | |
| 11,425,976 | B1 | 8/2022 | Tran | |
| D964,735 | S | 9/2022 | Zeng | |
| 11,439,214 | B2 | 9/2022 | Tran | |
| D967,626 | S | 10/2022 | Tran | |
| 11,457,704 | B2 | 10/2022 | Hoffman | |
| D972,841 | S | 12/2022 | Tran | |
| 11,653,729 | B2 | 5/2023 | Tran | |
| 2002/0117243 | A1 * | 8/2002 | Koren | G06F 3/04817 150/147 |
| 2002/0179463 | A1 | 12/2002 | Newman | |
| 2004/0148837 | A1 | 8/2004 | Lewis | |
| 2005/0035006 | A1 | 2/2005 | Dohner | |
| 2007/0109130 | A1 | 5/2007 | Edenfield | |
| 2008/0178976 | A1 * | 7/2008 | Lakhiani | A45C 1/06 150/147 |
| 2008/0314483 | A1 | 12/2008 | Armstrong | |
| 2009/0199940 | A1 | 8/2009 | Toner | |
| 2011/0308972 | A1 | 12/2011 | Streem | |
| 2012/0228168 | A1 | 9/2012 | Kitchen | |
| 2013/0056119 | A1 | 3/2013 | Henriette | |
| 2013/0135103 | A1 | 5/2013 | Holloway | |
| 2013/0276943 | A1 | 10/2013 | Minn | |
| 2014/0143958 | A1 | 5/2014 | Barr | |
| 2015/0059937 | A1 * | 3/2015 | Singer | A45C 1/06 206/38.1 |
| 2015/0083289 | A1 | 3/2015 | Johnson | |
| 2015/0240524 | A1 | 8/2015 | Olroyd | |
| 2015/0257499 | A1 | 9/2015 | Muir | |
| 2015/0282579 | A1 | 10/2015 | Piro | |
| 2016/0022000 | A1 | 1/2016 | Tucker-Skow | |
| 2016/0206065 | A1 | 7/2016 | Ehrlich | |
| 2016/0324283 | A1 | 11/2016 | Kane | |
| 2016/0374443 | A1 | 12/2016 | Kim | |
| 2017/0035169 | A1 | 2/2017 | Haarburger | |
| 2017/0055654 | A1 | 3/2017 | King | |
| 2017/0119115 | A1 | 5/2017 | King | |
| 2017/0135452 | A1 | 5/2017 | Kane | |
| 2017/0224077 | A1 | 8/2017 | Mayer | |
| 2017/0265610 | A1 | 9/2017 | Smith | |
| 2018/0027935 | A1 | 2/2018 | Laatz | |
| 2018/0064223 | A1 | 3/2018 | Singer | |
| 2018/0311804 | A1 | 11/2018 | Weinberger | |
| 2018/0325228 | A1 | 11/2018 | Leimer | |
| 2018/0332936 | A1 | 11/2018 | Serman | |
| 2018/0368547 | A1 | 12/2018 | Grannan | |
| 2019/0008253 | A1 | 1/2019 | Deng | |
| 2019/0318667 | A1 | 10/2019 | Freeman | |
| 2019/0365066 | A1 | 12/2019 | Hill | |
| 2020/0077758 | A1 | 3/2020 | Hoffman | |
| 2020/0229557 | A1 | 7/2020 | Tran | |
| 2020/0305564 | A1 | 10/2020 | Myers | |
| 2020/0379509 | A1 | 12/2020 | Coward | |
| 2021/0112935 | A1 | 4/2021 | Tran | |
| 2021/0330045 | A1 | 10/2021 | Tran | |
| 2021/0337945 | A1 | 11/2021 | Popoff | |
| 2022/0225742 | A1 | 7/2022 | Tran | |
| 2023/0248127 | A1 | 8/2023 | Tran | |

FOREIGN PATENT DOCUMENTS

| | | | |
|---|---|---|---|
| CN | 306924723 | | 11/2021 |
| KR | 101356236 | B1 | 1/2014 |
| KR | 20140003803 | U | 6/2014 |
| WO | 2006021042 | A1 | 3/2006 |

OTHER PUBLICATIONS

Onward Innovation—"RFID Carbon Fiber Cash Strap Wallet"—Downloaded Jun. 11, 2022—Available from Internet <URL: https://onwardinnovation.com/products/rfid-carbon-fiber-cash-strap-wallet>.

Ridge—"Aluminum—Black"—Downloaded Apr. 9, 2021—Available from Internet <URL: https://ridge.com/products/aluminum-black?>.

Titan X—"Titan X | Pro Edition"—Downloaded Jun. 11, 2022—Available from Internet <URL: https://titanxwallet.com/products/edition>.

Alpine Swiss—"Alpine Swiss Genuine Leather Super Thing Slim Cash Strap Front Pocket Wallet"—Downloaded Apr. 9, 2021—Available from Internet <URL: https://www.alpineswiss.com/alpine-swiss-genuine-leather-super-thin-slim-cash-strap-front-pocket-wallet/>.

Simple Zone—"Carbon Fiber Wallet for Men, Simple Zone RFID Blocking Slim Minimalist Card Holder Wallet with Money Clip and Cash Strap"—First available Jun. 18, 2020—Downloaded Apr. 9, 2021—Available from Internet <URL: https://www.amazon.com/Carbon-Simple-Zone-Blocking-Minimalist/dp/B08BG4G8GJ>.

Dango Products—"T01 Tactical Bifold Wallet—Spec-Ops—Blueline"—Downloaded Apr. 9, 2021—Available from Internet

(56) References Cited

OTHER PUBLICATIONS

<URL: https://www.dangoproducts.com/products/t01-tactical-bifold-wallet-blueline-spec-ops?variant=21433891881044>.

Dango Products—"Dango M1 Maverick Wallet—CNC- Machined Aluminum, RFID Blocking, Made in USA"—First available Jan. 12, 2019—Downloaded Jun. 11, 2022—Available from Internet <URL: https://www.amazon.com/dp/B07MMDRGCV>.

Dango Products—"Dango Products—M1 Maverick Bifold Wallet"—Video by user Dango Products—First available Nov. 29, 2018—Downloaded May 24, 2021—Available from Internet <URL: https://www.youtube.com/watch?v=kqF_xCWWLOU>.

Muradin—"Muradin Dapper Leather Bifold Wallet—Genuine Tactical Wallet—Card Wallet for Men—RFID-Blocking Aluminum Metal Wallet"—First available Nov. 22, 2020—Downloaded May 24, 2021—Available from Internet <URL: https://www.amazon.com/Muradin-Dapper-Leather-Bifold-Wallet/dp/B07ZPXH81N?th=1>.

Dango Products—"A10 Adapt Wallet"—Downloaded May 25, 2021—Available from Internet <URL: https://www.dangoproducts.com/collections/a-series-wallets/products/a10-adapt-wallet>.

Hanker—"Carbon Fiber Aluminum Metal Minimalist Wallet RFID Blocking Credit Card Holder Money Clip"—First available Feb. 7, 2019—Downloaded May 25, 20219—Available from Internet <URL: https://www.amazon.com/Carbon-Aluminum-Minimalist-Wallet-Blocking/dp/B07NHK6P55>.

EELV—"ELV Badge Holder Wallet, Aluminium ID Badge Card Holder Heavy Duty with Quick Release Button, Metal Clip for Offices ID, School ID, Driver Licence, Wallet, Holds 1-4 Cards"—First available Jan. 21, 2019—Downloaded Jun. 11, 2022—Available from Internet <URL: https://www.amazon.com/ELV-Aluminum-Release-Offices-License/dp/B07MZJYVBX/>.

Elephant Wallet—"N Wallet Carbon Fiber—Fabric Rubber"—Downloaded Mar. 17, 2021—Available from Internet <URL: https://elephantwallet.com/products/n-wallet-carbon-fiber>.

Elephant Wallet—"How Does It Work (X Wallet)"—Downloaded Mar. 17, 2021—Available from Internet <URL: https://elephantwallet.com/pages/how-does-it-work>.

Wallet Gear—"Bifold Leather Wallet with Elastic Band"—Downloaded Mar. 17, 2021—Available from Internet <URL: https://www.walletgear.com/bifold-leather-wallet-with-elastic-band.html>.

Curated Basics—"Elastic Band Minimalist Wallet"—Downloaded Mar. 17, 2021—Available from Internet <URL: https://www.curatedbasics.com/products/elastic-band>.

Dango Products—"Dango D03 Dapper Bifold EDC Wallet—Made in USA—Genuine Leather, Slim, Minimalist, Metal, RFID Blocking"—Downloaded Jun. 11, 2022—Available at least as of Apr. 22, 2021 (first review)—Available from Internet <URL: https://www.amazon.com/Dango-D03-Dapper-Bifold-Wallet/dp/B0925CV8CK?ref_=ast_sto_dp&th=1>.

Dango Products—"D03 Dapper Bifold Wallet"—Downloaded Jun. 11, 2022—Available from Internet <URL: https://www.dangoproducts.com/products/d03-dapper-wallet>.

Dango Products—"Dango Products: D03 Dapper Bifold Wallet"—Video by user Dango Products—First available Apr. 20, 2021—Downloaded Nov. 24, 2021—Available from Internet <URL: https://www.youtube.com/watch?v=QSLs3ABQcoY>.

Dango Products—"A10 Bifold Pen Adapter"—Video by user Dango Products—First available Jul. 15, 2020—Downloaded Nov. 24, 2021—Available from Internet <URL: https://www.youtube.com/watch?v=7y6fXT8Y0SI>.

Dango Products—"A10 Adapt Bifold Pen Wallet"—Downloaded Jun. 11, 2022—Available from Internet <URL: https://www.dangoproducts.com/products/a10-adapt-bifold-pen-wallet>.

Dango Products—"Dango M1 Maverick Rail EDC Wallet—Made in USA—All-Metal, Minimalist, Slim, RFID Blocking"—First Available Oct. 9, 2019—Downloaded Nov. 24, 2021—Available from Internet <URL: https://www.amazon.com/Dango-M1-Maverick-Rail-Wallet/dp/B07YWJWK9Z>.

Dango Products—"Dango M1 Maverick Rail Wallet"—First Available Oct. 7, 2019—Downloaded Nov. 24, 2021—Available from Internet <URL: https://www.youtube.com/watch?v=5xTPdgAZkL8>.

Dango Products—"M1 Maverick Rail Wallet"—Downloaded Nov. 24, 2021—Available from Internet <URL: https://www.dangoproducts.com/products/m1-maverick-rail-wallet.

Anvi Original—"MiniCap 1.0/2.0 Mens RFID Blocking Front Pocket Minimalist Slim Wallet With Pull Tab Money Clip"—First available Sep. 14, 2018—Downloaded Nov. 11, 2021—Available from Internet <URL: https://www.amazon.com/Minicap1-0-Blocking-Pocket-Minimalist-Wallet/dp/B07HCD1BRR>.

Leatheram—"Handmade pull up card holder, leather credit card case with pull tab, minimalist wallet, thin minimal wallet"—Available at least as of Dec. 14, 2019—Downloaded Jun. 11, 2022—Available from Internet <URL: https://www.etsy.com/listing/235786494/>.

Enigma—"MURADIN Chocolate Front Pocket Wallet for Men Travel Tactical bifold RFID Blocking Aluminum Metal Leather Money Cards Holder Ideal Men's Gift"—Available at least as of Jul. 6, 2021—Downloaded Jun. 11, 2022—Available from Internet <URL: https://www.amazon.com/Muradin-Chocolate-Tactical-Blocking-Aluminum/dp/B097SKPGJP>.

Nite Ize—"Nite Ize Financial Tool, Multi Tool Money Clip, Minimalist Wallet, Money Clip, Multi Tool, and Credit Card Holder Combo, Stainless Steel"—First available Mar. 1, 2018—Downloaded Jun. 11, 2022—Available from Internet <URL: https://www.amazon.com/gp/product/B078KZSGKR>.

Safe Price—"Stainless Steel Men Money Clip Elastic Band Slim Credit Card Holder Wallet Purse (Silver)"—First available Sep. 20, 2017—Downloaded Jul. 29, 2021 - Available from Internet <URL: https://www.amazon.com/Stainless-Elastic-Credit-Holder-Wallet/dp/B075S95PQ7?th=1>.

Micrometalinc—"Titanium Money Clip | Bottle Opener | CNC: 65MC43753F2 | 1x Money Clip"—Available at least as of May 13, 2020—Downloaded Jun. 11, 2022—Available from Internet <URL: https://www.etsy.com/listing/974788562>.

TI-EDC—"TI-EDC Titanium Slim Cash Money Clip Wallet Credit Card Holder and Bottle Opener"—First Available Dec. 10, 2013—Downloaded Jun. 11, 2022—Available from Internet <URL: https://www.amazon.com/TI-EDC-Titanium-Wallet-Credit-Holder/dp/B00H7UHZZY>.

Cheers All—"Beer Opener Money Clip"—Downloaded Jun. 11, 2022—Available from Internet <URL: https://cheersall.com/products/beer-opener-money-clip>.

Nomatic—Wallet—Downloaded Jun. 11, 2022—Available from Internet <URL: https://www.nomatic.com/products/wallet>.

Distil—Wally Bifold Classic—Downloaded Jun. 11, 2022—Available from Internet <URL: https://distilunion.com/products/wally-bifold>.

ENIGMA—ENIGMA Dapper PU Leather Bifold Front Pocket Slim Wallet for Men, Aluminum Metal Travel Tactical RFID Blocking Card Holder Money Clip, Ideal Men's Gift—Available at least as of Jul. 13, 2021—Downloaded Jun. 11, 2022—Available from Internet <https://www.amazon.com/ENIGMA-Leather-Aluminum-Tactical-Blocking/dp/B097RCJJVJ>.

Dango Products—"Dango Products—M1 Maverick Bifold Wallet Spec-Ops Edition"—First Available Nov. 29, 2018—Downloaded Nov. 23, 2021—Available from Internet <URL: https://www.youtube.com/watch?v=KSFzWMDOTAc>.

Dango Products—"Dango Products—MT01 Clasp Multi-Tool"—First Available Mar. 19, 2019—Downloaded Nov. 23, 2021—Available from Internet <URL: https://www.youtube.com/watch?v=7SVGTLoDUSE>.

Dango Products—"A10 Adapt Wallet"—Downloaded Jun. 11, 2022—Available from internet <URL: https://www.dangoproducts.com/collections/a-series-wallets/products/a10-adapt-wallet>.

Dango Products—"Dango Products—A10 Adapt Wallet"—First available: Jul. 15, 2020—Downloaded Jun. 11, 2022—Available from internet <URL: https://www.youtube.com/watch?v=EheKLMq84-8>.

(56) References Cited

OTHER PUBLICATIONS

Dango Products—“M1 Maverick Wallet”—Downloaded Sep. 8, 2022—Available from Internet <URL: https://www.dangoproducts.com/collections/m1-maverick-wallets/products/m1-maverick-tactical-bifold-wallet-raw>.

Dango Products—“D01 Dapper Wallet”—Downloaded Sep. 8, 2022—Available from Internet <URL: https://www.dangoproducts.com/products/d01-dapper-wallet>.

Dango Products—“Dango Products—A10 Pull Pocket Adapter”—Video by user Dango Products—First available Feb. 17, 2021—Downloaded Sep. 30, 2022—Available from Internet <URL: https://www.youtube.com/watch?v=DTIdZDIBk2I>.

Dango Products—“Dango Products—T01 Tactical and D01 Dapper Wallet | Overview and Instructions” Video by user Dango Products—Available from Internet: <URL: https://www.youtube.com/watch?v=Sj60qwXjZAA> (Year: 2016).

Dango Products—“Dango Products | Redefining the Wallet”—Kickstarter@ campaign—Available from Internet: <URL: https://www.kickstarter.com/projects/1592811030/dango-products-redefining-the-wallet/description> (Year: 2016).

SEMORID—“SEMORID Leather Skin Rfid Credit Card Holder Metal Men Wallets 2021 Badge Cardholder Aviator Minimalist Wallet for Card”—Downloaded Jan. 10, 2023—Available from Internet: <URL:https://www.aliexpress.us/item/3256801654742032.html.

Fashion Wallet—“2022 Genuine Leather Metal Rfid Credit Card Holders Anti-Thieft Bifold Money Bag Business Badge Minimalist Men Wallet”—Downloaded Jan. 10, 2023—Available from Internet: <URL: https://www.aliexpress.US/item/3256804138918235.html>.

* cited by examiner

WALLET

TECHNICAL FIELD

The present invention relates to wallets and systems and methods for manufacturing a wallet.

BACKGROUND

The statements in this section merely provide background information related to the present disclosure and may not constitute prior art.

The use of wallets is well-known. Wallets are designed to carry articles such as credit cards, currency, business cards, pictures, keys, identification cards, licenses (such as a driver's license), plus assorted other paper items. The most common type of wallet has one or more compartments and is made to be carried in a pocket, specifically in one's back trouser's pocket. These wallets are, in general, made from fabric and/or leather goods and sewn to form storage pockets. They may also utilize a metal clip of sorts intended to hold paper currency. These storage pockets are typically sewn to hold one card or a few cards. Each pocket adds a layer of material, increasing the wallet's overall thickness and limiting the amount of cards a wallet can carry. The result is that the wallet becomes bulky in size and if carried in one's trousers, the wallet can produce a significant, uncomfortable bulge.

Known wallets are additionally disadvantaged by stretching and become loose over time, leaving the cards and identification vulnerable to falling out and becoming lost, leaving the owner exposed to the possible threat of identity theft.

One known solution utilizes a clip to attempt to hold cards and currency without the use of fabric or leather. These money clips are sometimes used alone to hold currency or they are integrated into a container to hold the cash with the user's cards. In either case the card's security is based on the spring tension of the clip. These clips, because of the spring tension, limit the maximum amount of cards a user can carry. Money clips are additionally problematic when used with a few items, as less tension is available to hold the items securely. Furthermore, personal credit cards and security cards are vulnerable to Radio Frequency Identification (RFID) theft in a conventional clip-based holder, wallet and purse.

SUMMARY

In one aspect, a wallet includes a first metal shell with one or more openings on a shell perimeter adapted to clip one or more objects to the one or more openings; a second metal shell coupled to the first shell with a storage compartment therebetween; and securing a soft material to the first and second metal shells, wherein the soft material comprises compartments to store cards or money therein.

Implementations of the above aspect may include one or more of the following. The shell combines CNC machined and anodized aluminum with top grain leather; a fine mixture of industrial hardware and plush elegance. The chassis has 4 Loop Holes incorporated into each corner to attach keys, lanyards and tethers for both lefties and righties. The surface of the chassis is anodized slate grey and assembled with jet Black or whiskey brown leather. The wallet can be a single wallet or a bifold wallet. The Bifold Wallet variant comes equipped with a high capacity 4 pocket bifold leather (holds up to 3-4 cards per pocket) held together by mil-spec stainless steel bolts. The front and inner leather pocket is designed for easy access to ID cards and more frequently used cards. Push notches are provided to allow the thumb to easily push cards out of the wallet for access. The metal RFID blocking card cavity can hold up to 6 cards depending on card thicknesses. Military Specified hex screws can be used to attach the two shells together. A silicone wallet band can be wrapped around one or both shells to secure paper or cash to the wallet.

Advantages may include one or more of the following. The metal wallet surprisingly retains a slim & sleek profile while holding its maximum capacity of 14-16 cards+cash. The wallet is elegant and sophisticated with an industrial edge which sets it apart from other slim wallet designs. Inspired by military, first responders, and hardcore preppers, the utility vertical wallet has a robust yet sleek design that is built for the rugged and tactical lifestyle. This wallet is the perfect companion for the everyday survivalist. The wallet combines CNC Machined aluminum with a DTEX material; a fine mixture of an industrial "bullet-proof" chassis with a wallet skin that is resilient, flexible and water resistant. The surface of the Ml chassis is ceramic coated with a firearms industry standard ceramic paint tough enough to withstand rough handling. The Single Pocket variant comes with its pairing Multi-Tool which has over 10 functions which are specifically designed to respond to life threatening and emergency situations. The functions of the multi-tool include: a seat belt cutter, serrated/sharpened edges, chisel, 2 paracord tensioners, an 02 oxygen wrench, nail pryer, standard ¼" inch hex wrench, and of course, a bottle opener. The tool or accessory slides into the metal cavity where the cards sit and is nested securely onto the safety locks on the chassis.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 1 shows a front view while

FIG. 7 shows a front view of a bifold embodiment, while

FIG. 9 shows a front view of a bifold embodiment, while

FIGS. 16-17A show exemplary front and side views of an accessory that can be embedded in the wallet.

FIGS. 17B-17C show exemplary first position, second position of the locking mechanism of the accessory, while

FIG. 20 shows a front view of a second bifold embodiment, while

FIG. 22 shows a front view of the bifold embodiment of FIG. 19, while

FIGS. 24-25 show the left and right views of the second bifold embodiment in a closed position, while

FIG. 28 shows a top view of the second bifold embodiment, while

DETAILED DESCRIPTION

Figure 1:
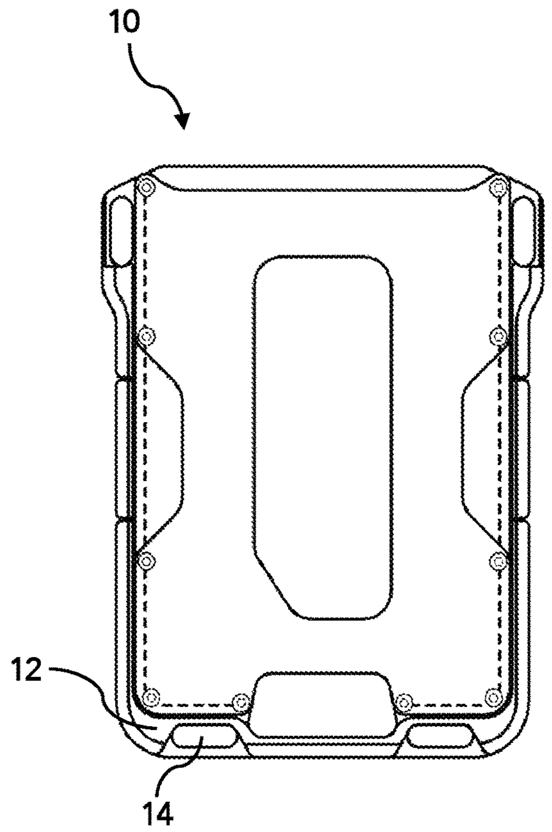

Various embodiments of the present invention will be described in detail with reference to the drawings, where like reference numerals represent like parts and assemblies throughout the several views. The FIGS. illustrate an exemplary embodiment of a wallet and a method for assembling the same, wherein the depictions are for the purpose of illustrating certain exemplary embodiments only and not for the purpose of limiting the same. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Based on the foregoing, it is to be generally understood that the nomenclature used herein is simply for convenience and the terms used to describe the invention should be given the broadest meaning by one of ordinary skill in the art.

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 2:
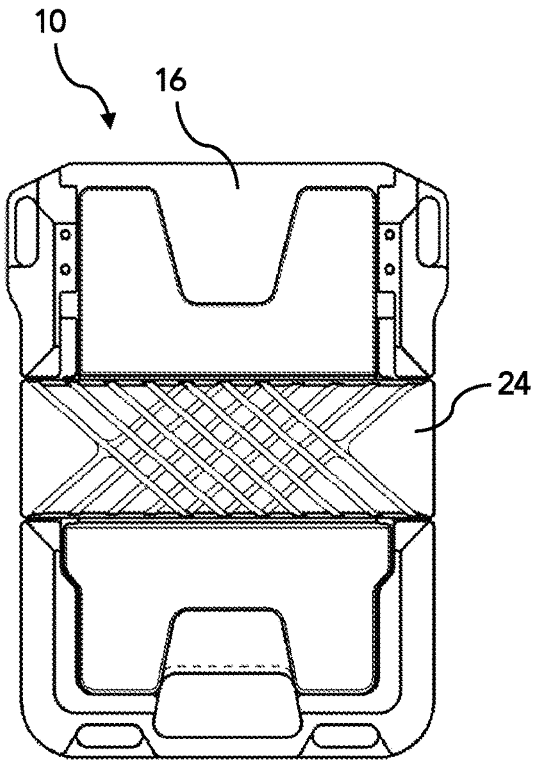
FIG. 2 shows a back view of a single pocket embodiment.
Figure 3:
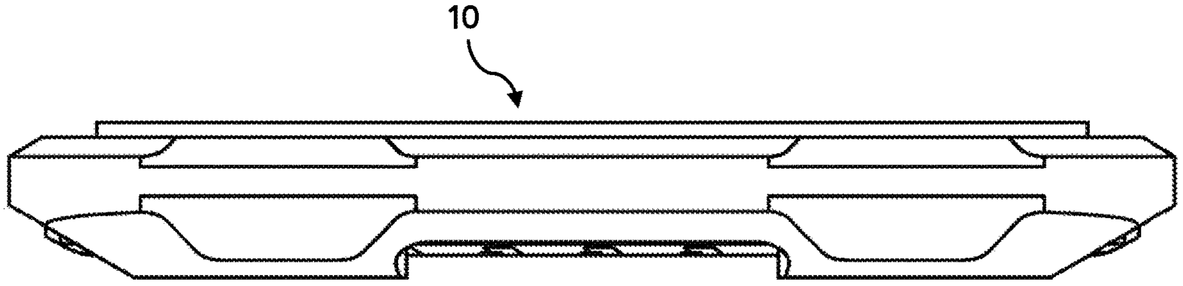
FIG. 3 is a top view of a wallet in one embodiment.
Figure 4:
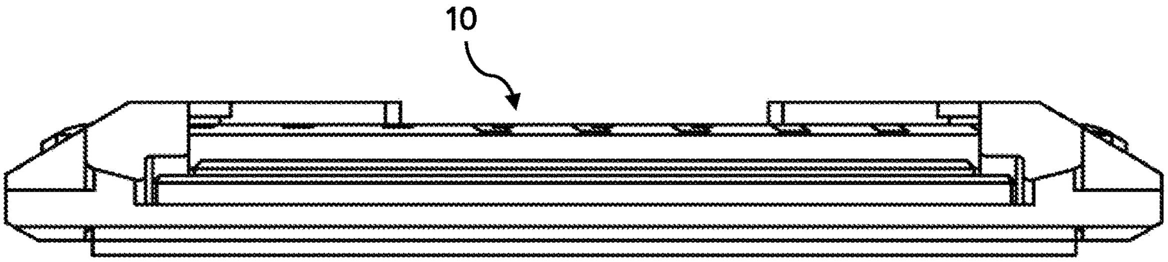
FIG. 4 is a bottom view of a wallet in one embodiment.
Figure 5:
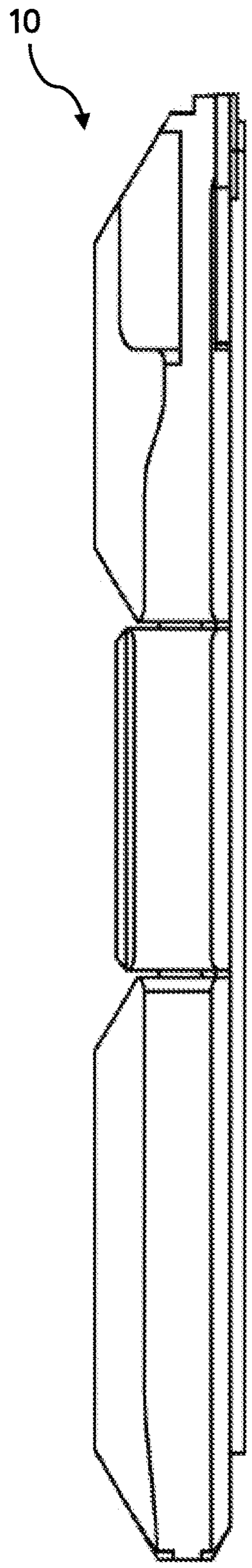
FIGS. 5 and 6 show left and right-side views of the single pocket embodiment.
Figure 6:
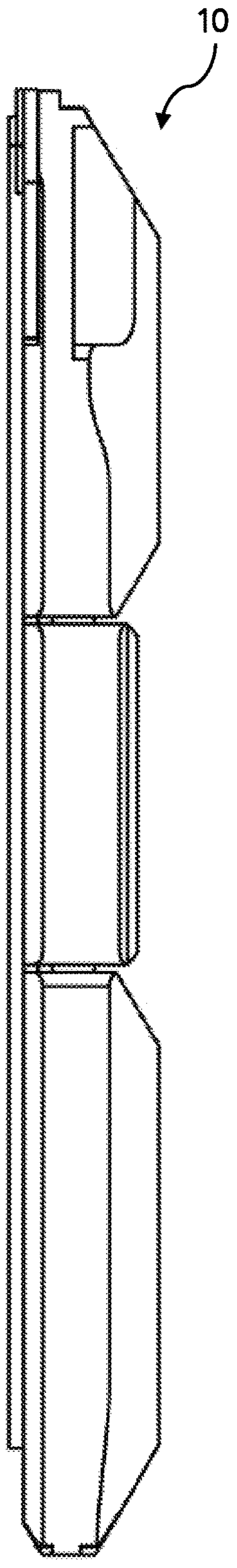

FIG. 1 shows a front view while FIG. 2 shows a back view of a single pocket embodiment called the Ml or Maverick. FIG. 3 is a top view of a wallet, indicated by reference character 10 throughout the Figures, while FIG. 4 is a bottom view of the wallet in one embodiment, while FIGS. 5 and 6 show left and right-side views of the single pocket embodiment.

In this embodiment, the Ml combines CNC machined and anodized aluminum with top grain leather; a fine mixture of industrial hardware and plush elegance. The chassis, indicated by reference character 12 in FIG. 1, has 4 Loop Holes, indicated by reference character 14 in FIG. 1, incorporated into each corner to attach keys, lanyards and tethers for both lefties and righties. The surface of the Ml chassis is anodized slate grey and assembled with jet Black or whiskey brown leather, among others.

In an embodiment, the wallet may be used for securing financial instruments, organizing and carrying currency, credit cards, identification cards (such as a driver's license) and any such item generally carried about one's person. It is contemplated that the size and shape of the container may be adapted for use for particular articles. For example, in another embodiment, the wallet may be sized and adapted for use as a container for business cards. A clip in this embodiment is generally configured for holding paper currency, although it may function to hold a number of varying articles. In yet another embodiment, the clip may be used to fasten the container to another object such as a pocket, personal organizer or book, for example.

Figure 7:
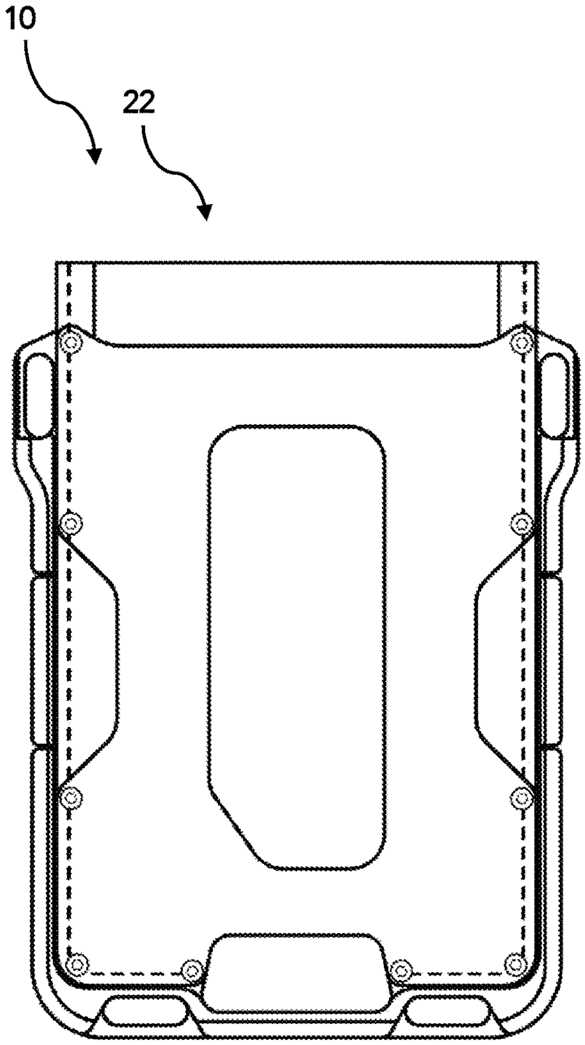
Figure 8:
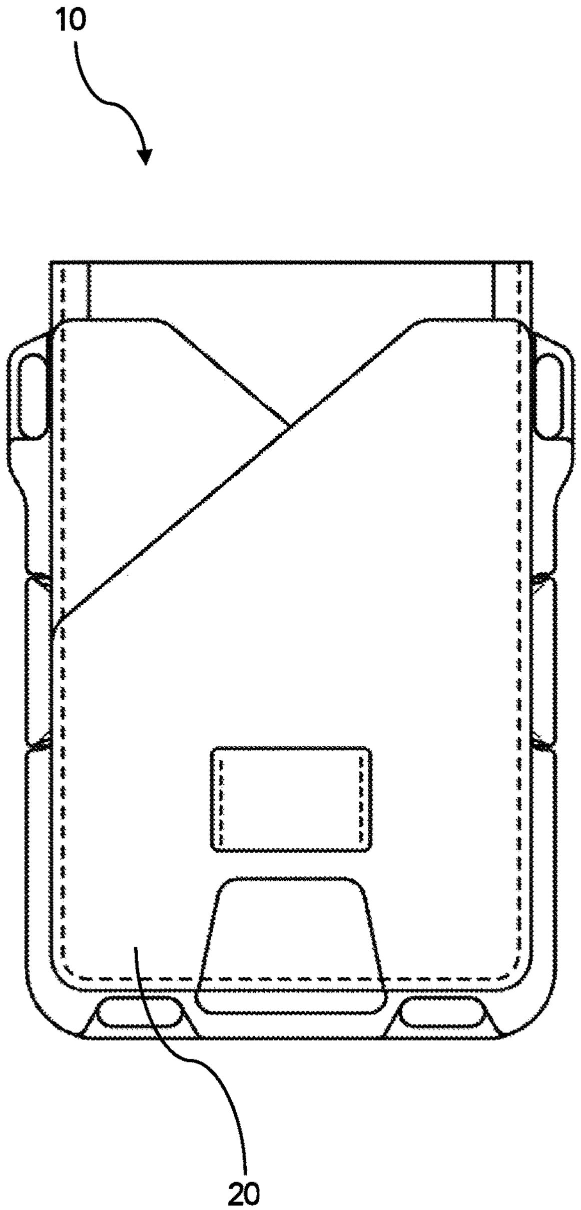
FIG. 8 shows a back view of a bifold embodiment in an open position.

FIG. 7 shows a front view of a bifold embodiment, while FIG. 8 shows a back view of a bifold embodiment in a closed position. A small slot is provided in the back to hold a key or a flat and elongated object. This bifold wallet variant comes equipped with a high capacity 4 pocket bifold leather (holds up to 3-4 cards per pocket) held together by mil-spec stainless steel bolts. The front and inner leather pocket is designed for easy access to ID cards and more frequently used cards. A metal RFID blocking card cavity, indicated by reference character 22 in FIG. 7, can hold up to 6 cards depending on card thicknesses. The M1 Bifold Wallet surprisingly retains a slim & sleek profile while holding its maximum capacity of 14-16 cards+cash. The Maverick Wallet is elegant and sophisticated with an industrial edge which sets it apart from other slim wallet designs.

Figure 9:
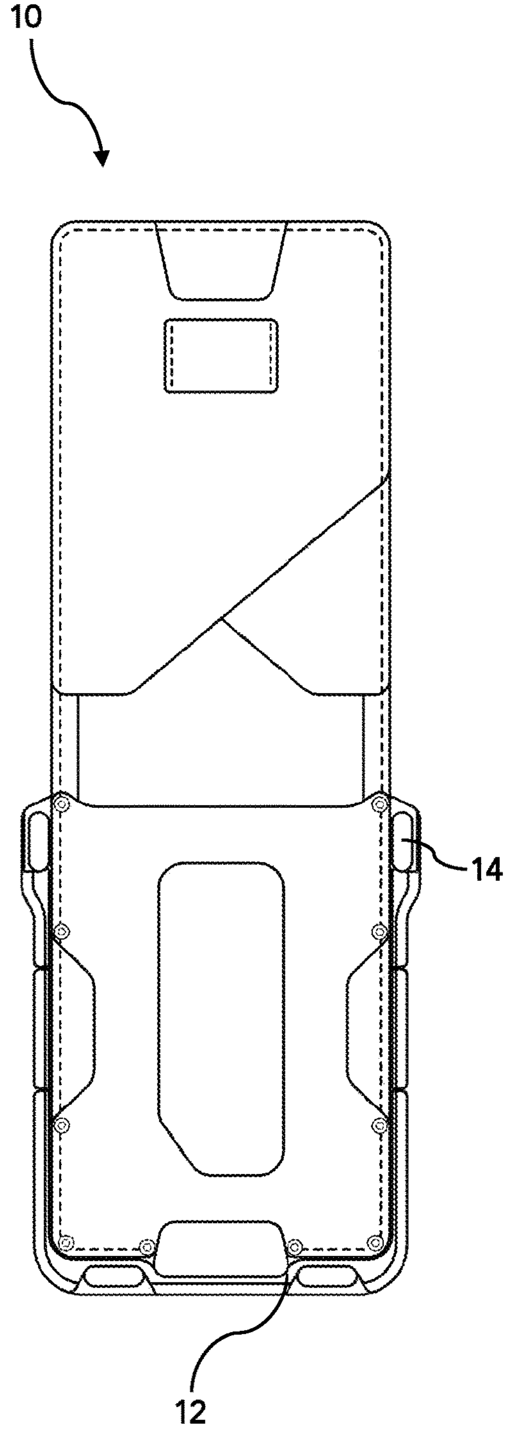
Figure 10:
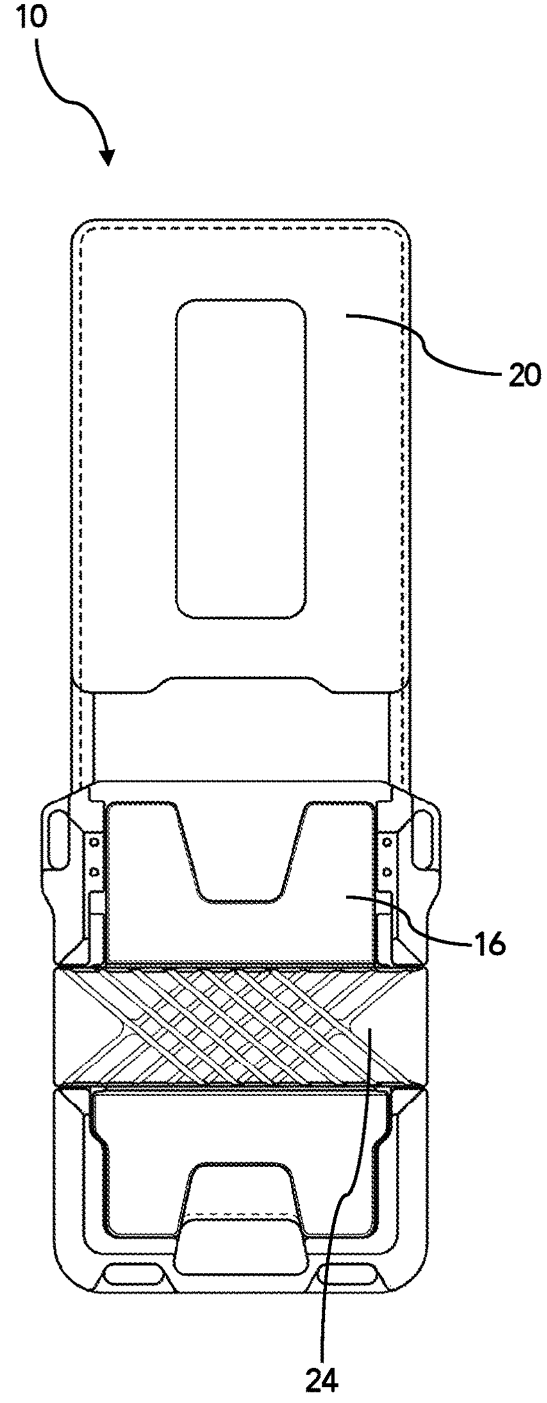
FIG. 10 shows a back view of a bifold embodiment in an open position.
Figure 11:
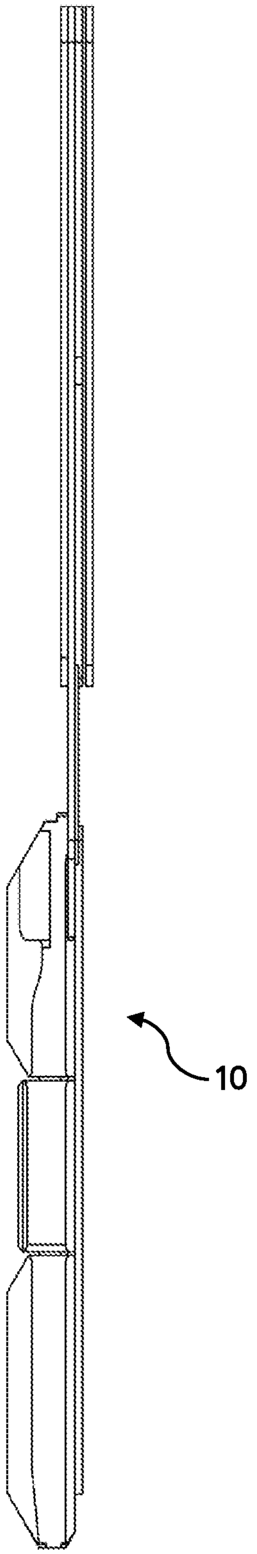
FIGS. 11 and 12 show left and right-side views of the bifold embodiment.
Figure 12:
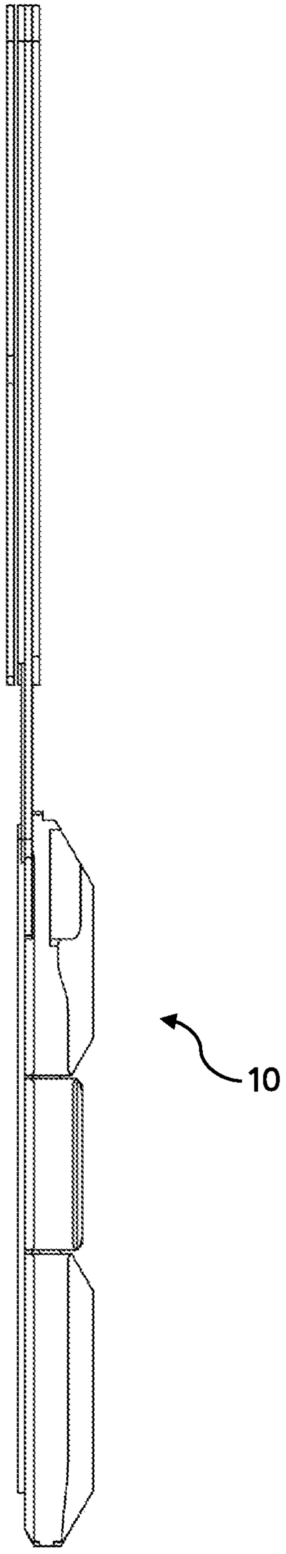
Figure 13:
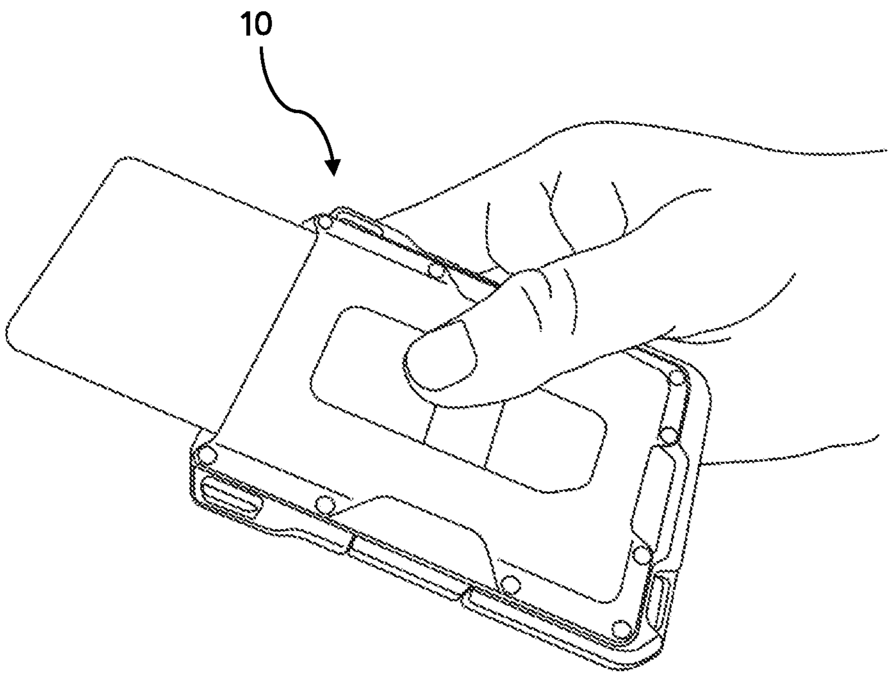
FIGS. 13 and 14 show front and back views of the bifold embodiment.
Figure 14:
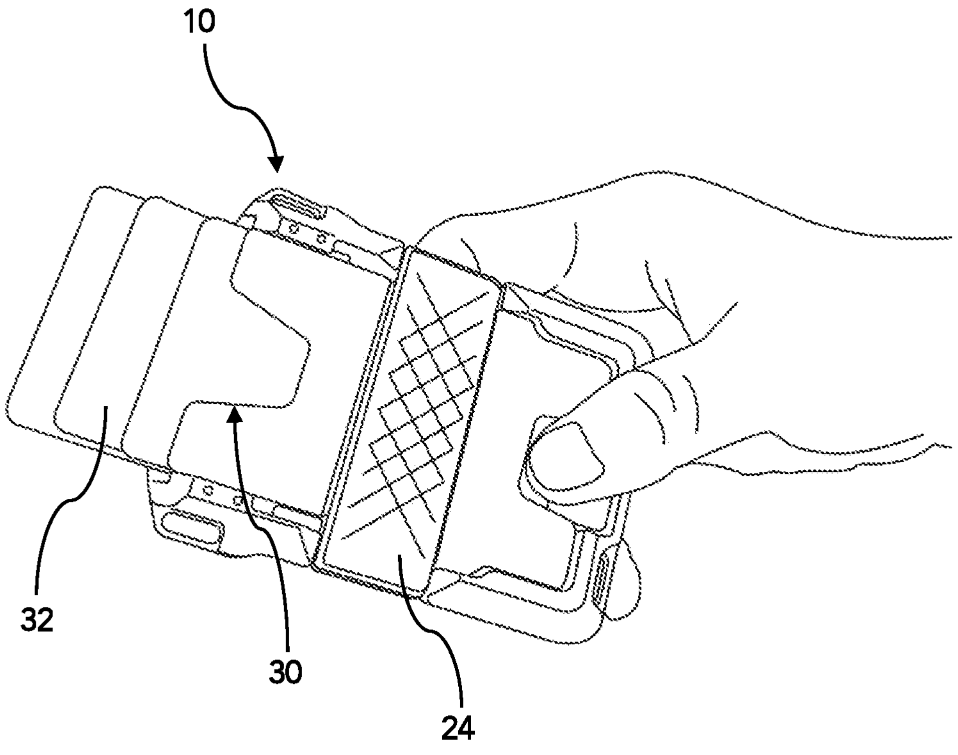

FIG. 9 shows a front view of a bifold embodiment, while FIG. 10 shows a back view of a bifold embodiment in an open position. FIGS. 11 and 12 show left and right-side views of the bifold embodiment. FIGS. 13 and 14 show front and back views of the bifold embodiment. The front has a pocket such as a leather pocket with a clearance area or opening to access cards by pushing with the thumb and pulling from the top. The back of the wallet has an RFID protection plate, indicated by reference character 16 in FIG. 10, that covers the cards, with a small opening or insert at the bottom to push the cards forward where they can be removed from the wallet. The cards may include, for example, credit cards, public transportation cards, driver's license, swipe cards, or any other type of card. Many users, or people, have one or more cards that they use daily or frequently, which may be referred to in the present disclosure as "frequent-use cards." Many users, or people, also have one or more additional cards that they may use less frequently than those of daily use but may still want to carry those cards in their wallets. These less frequently used cards may be referred to in the present disclosure as "occasional-use cards." In some embodiments, the wallet may be configured to store the frequent-use cards in a manner that allows immediate access to the frequent-use cards. In some embodiments, the wallet may also be configured to store the occasional-use cards in a manner that allows easy access to the occasional-use cards.

As one skilled in the art will readily recognize, the RFID shielding material can be included using various techniques. The radio frequency shielding material can include a conductive material such as a metal or an electrically conductive plastic. The RFID shielding can be integral of the wallet material or attached using adhesive as a thin lining, in one embodiment. The radio frequency shielding material can include a mesh with a mesh size small enough to provide shielding against the radio frequency range used by RFID readers. In many embodiments the RFID shielding material is either flexible, transparent, or both. Examples of suitable RFID shielding materials include metal-coated elastomers such as aluminized Mylar and copper-coated plastic sheets and films. In some embodiments, the RFID shielding material is a semi-transparent mesh. Enveloping identification cards or credit cards with a material that blocks radio frequencies keeps information stored on the cards secure while in the closed wallet. Additionally, forming the wallet of materials that include metal materials that block or absorb radio frequencies will also protect the information stored on the cards.

In some embodiments, the RFID shielding material is effective to form a Faraday cage around the ID, object, or key. Closing the closure can be effective to complete the Faraday cage, in some instances. In other embodiments the RFID shielding is used in selective locations in the holder. The RFID shielding shields an RFID tag from a reader in two ways. First, the RFID shielding greatly reduces the power being broadcast from the reader that reaches the RFID tag within the holder. This cuts the power available to the RFID tag to transmit information back. Secondly, even if the RFID tag receives enough power to transmit, the signal sent from the RFID tag is also attenuated. Accordingly, it will be appreciated that the effectiveness of the RFID shielding can be varied considerably based on choices of radio frequency shielding materials and their thicknesses, mesh sizes, and so forth.

Figure 15:
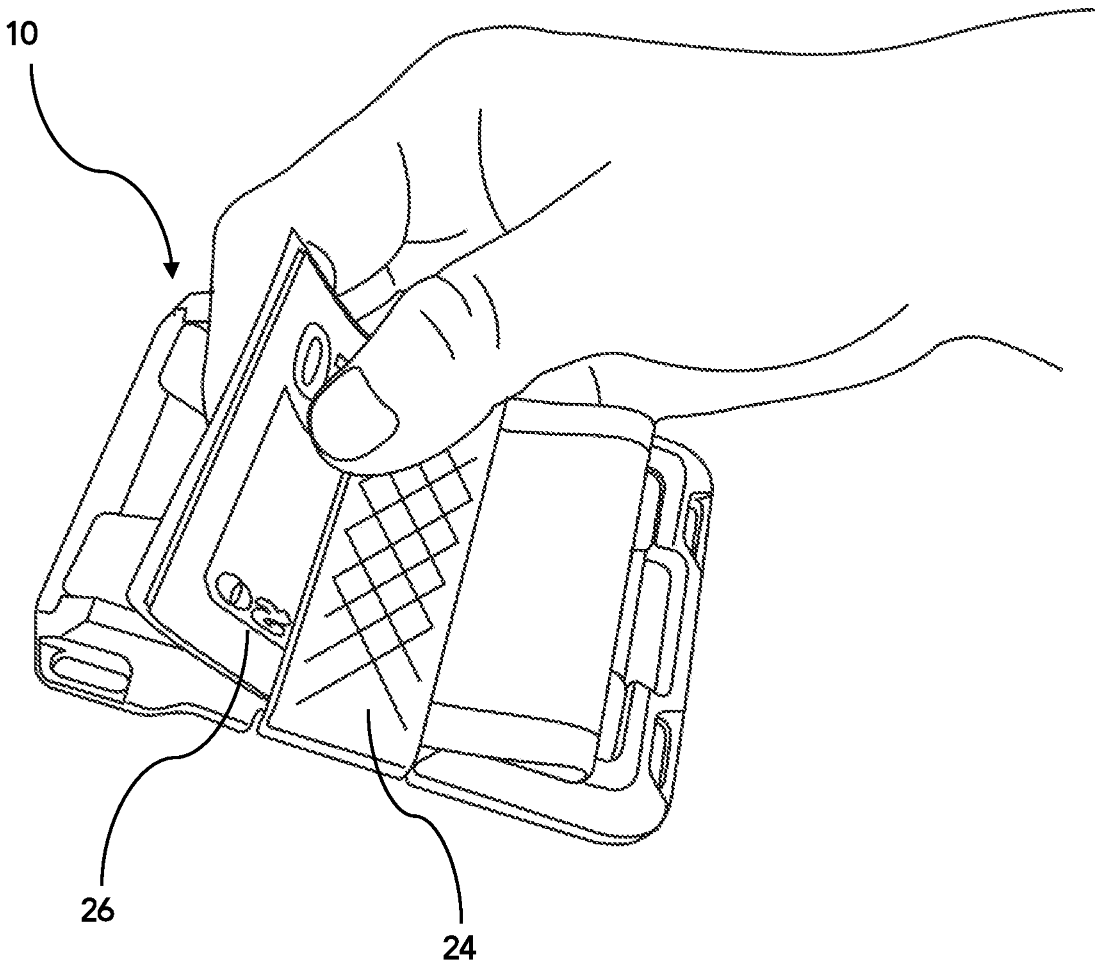
FIG. 15 shows a money band that encircles the body of the wallet to secure paper money to the wallet.

FIG. 15 shows a money band, indicated by reference character 24 in FIGS. 14 and 15, that encircles the body of the wallet to secure paper money, indicated by reference character 26, to the wallet. The money band can be a rubber or flexible material that is slipped over the wallet and when released, tightly clamps money to the wallet.

Figure 16:
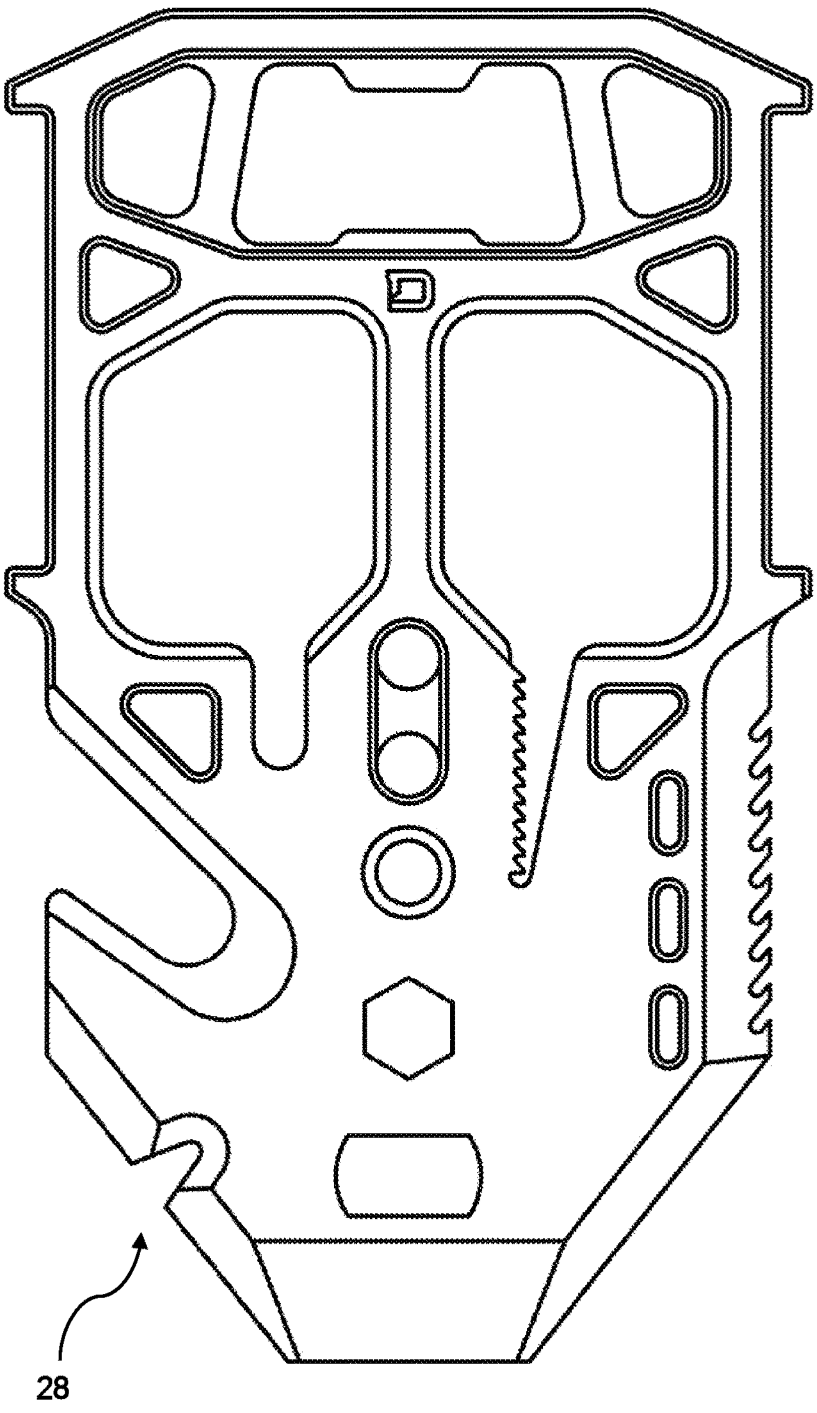
Figure 17A:
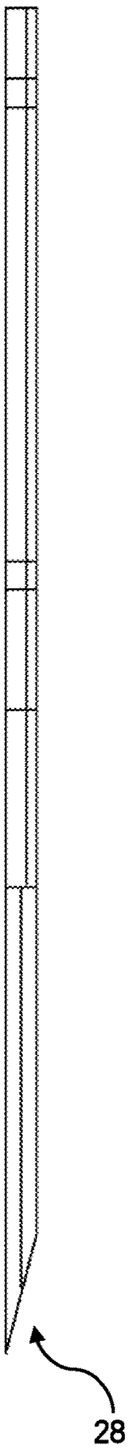
Figure 17B:
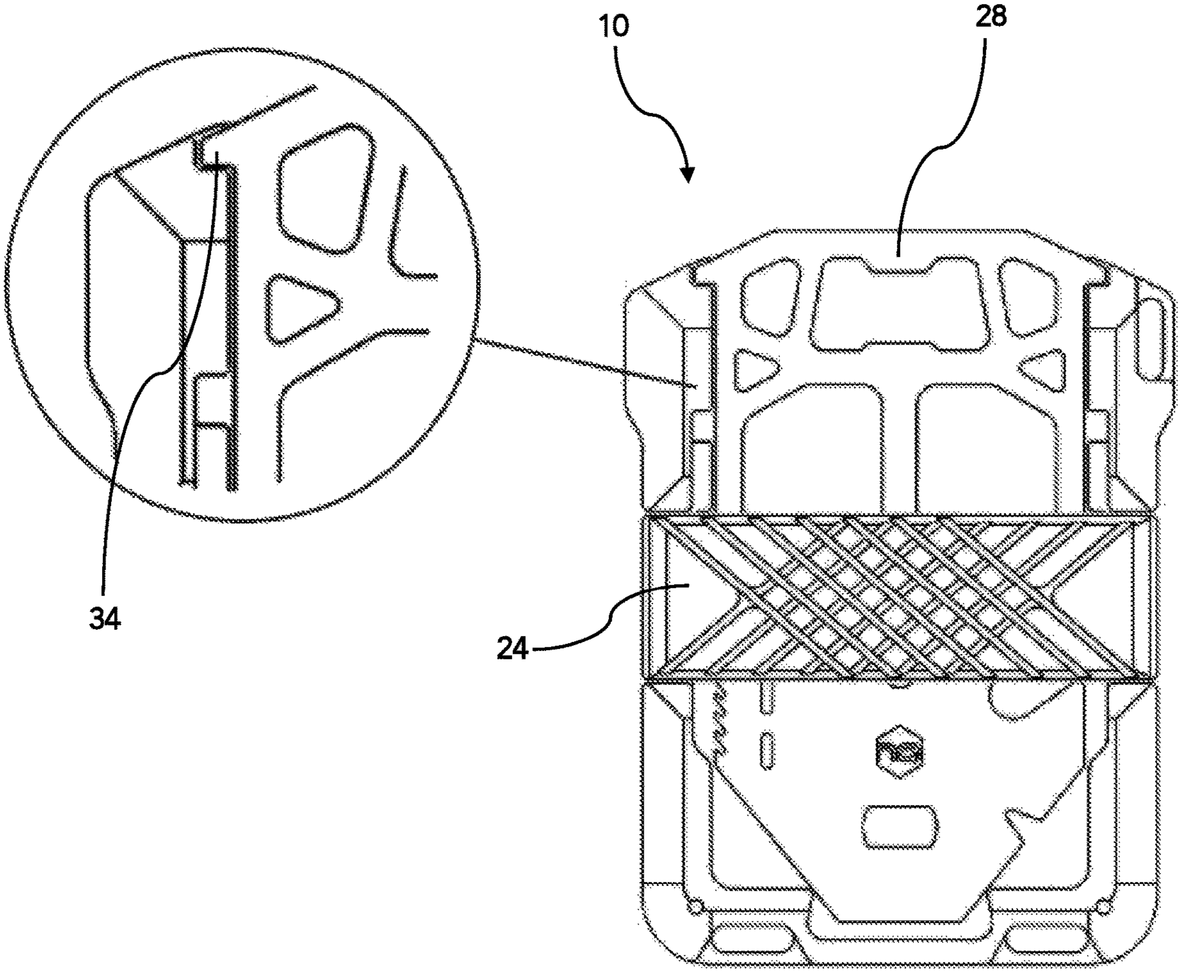
Figure 17C:
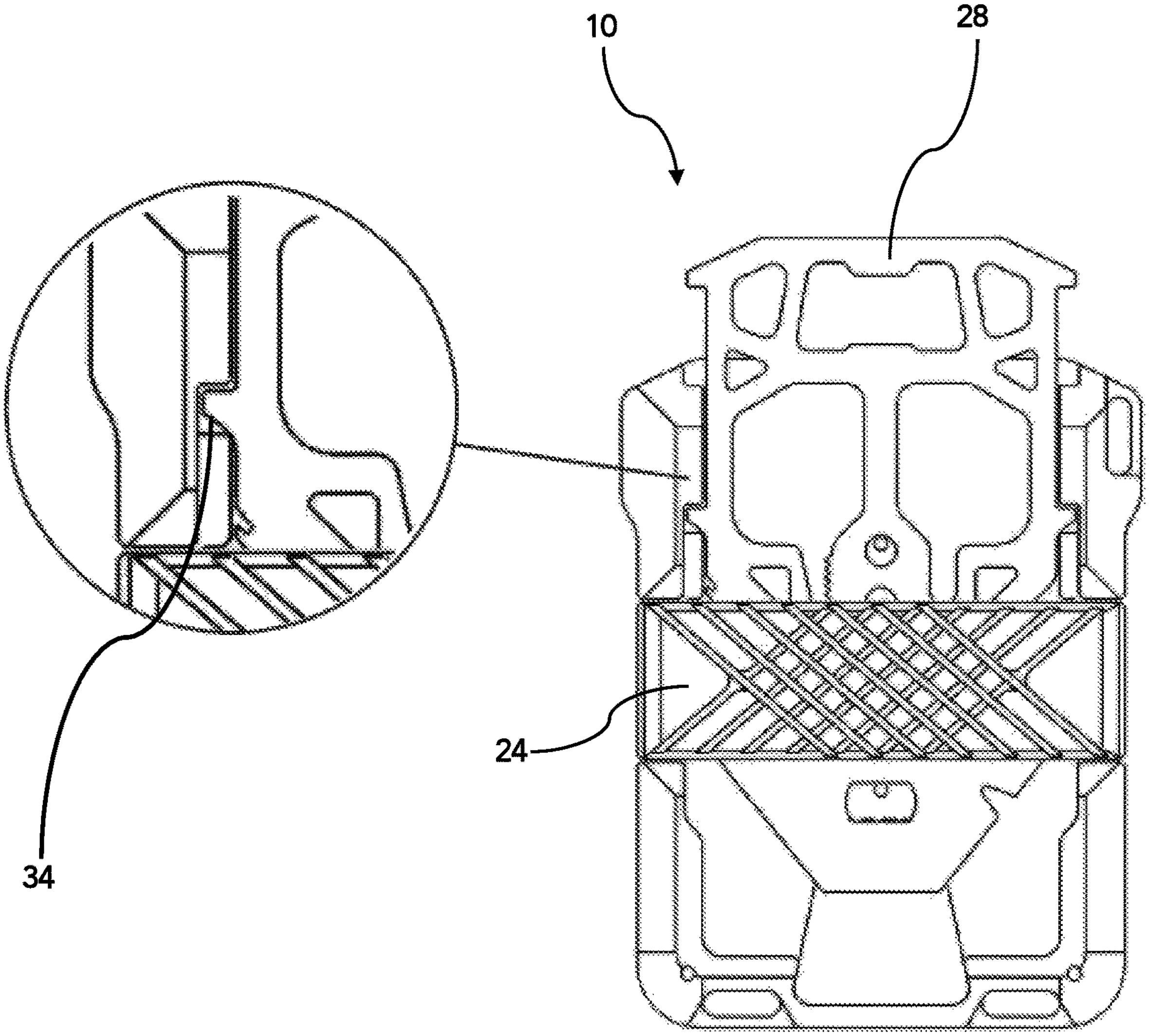
Figure 17D:
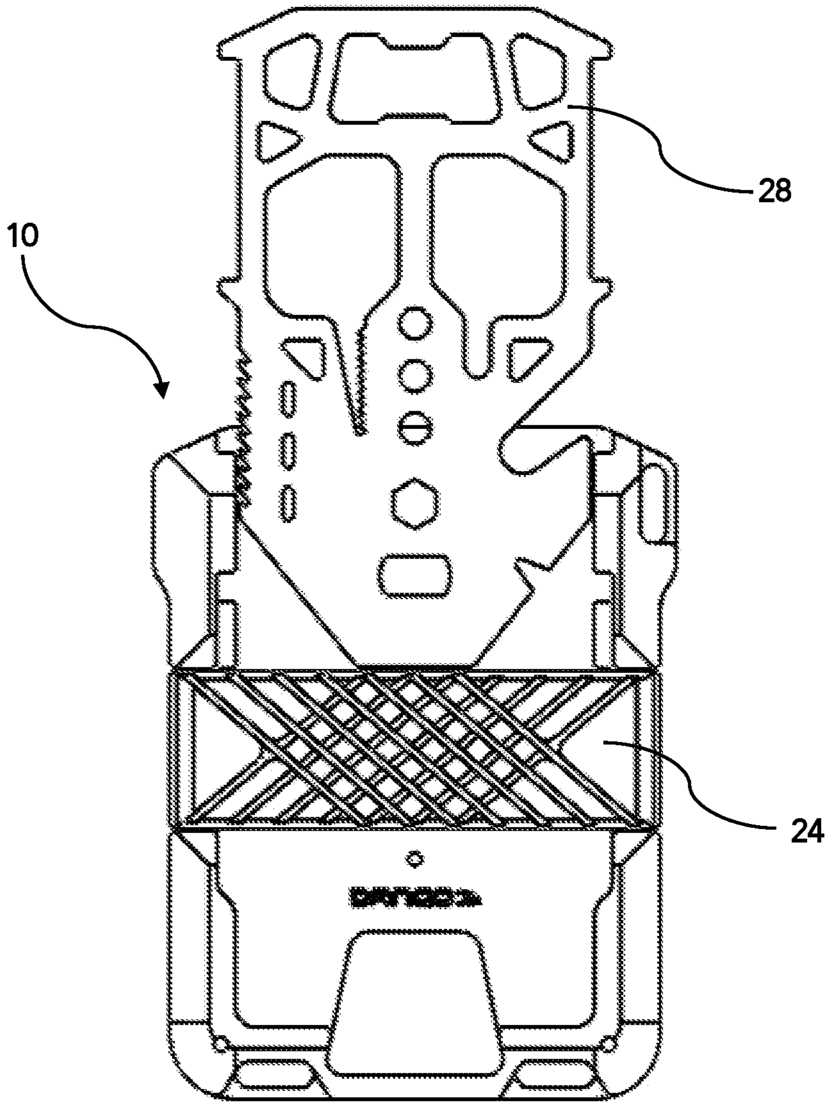
FIG. 17D shows the completely removed accessory.

Certain variants of the wallet comes with a flat multi-tool, indicated by reference character 28 in FIGS. 16-17D, that is stored into the metal pocket cavity of the chassis. This multi-tool is made of heat treated stainless steel. The manufacturing process of the multi-tool consists of precision cutting the multi-tool's basic shape out of a 2 mm stainless steel sheet metal. That unit is then brought into a CNC (computer numerical control) mill to cut out the details for the multi-tool's functions. This multi-tool has several functions including a knife, bottle cap opener, multiple wrenches, nail pryer (to pry nails), and rope tensioners.

FIGS. 16-17 show exemplary front and side views of an accessory that can be embedded in the wallet. In one embodiment, the accessory is a multi-tool device which has over ten functions. In this embodiment, the multi-tool device can respond to life threatening and emergency situations. For example, the device has a seat belt cutter, serrated/sharpened edges, a chisel, two paracord tensioners, an oxygen wrench, a nail pryer, a hex wrench (such as a ¼" hex wrench), and a bottle opener. The accessory slides into a cavity, indicated by reference character 30 in FIG. 14, where the cards, indicated by reference character 32 in FIG. 14, are stored, and is nested securely within the cavity with two safety locks onto the chassis.

FIGS. 17B-17C show exemplary first position, second position of the locking mechanism of the accessory, while FIG. 17D shows the completely removed accessory.

The multi-tool works with the wallet by positional points that are paired by male tabs, indicated by reference character 34 in FIGS. 17B and 17C, on the multi-tool's outer sides and female inserts on the inner sides of the wallet's metal cavity. This mechanism happens behind the silicone band and back-plate. The multi-tool has a total of 4 tabs—2 tabs each on the left and right side, to offer 2 points of positions:

FIG. 17B shows the first position is a concealed position that locks the multi-tool into place inside of the chassis' metal pocket. This also helps so that the multi-tool does not fall out of the chassis. To remove the multi-tool from the chassis, the user must lift the top of the multi-tool towards him/her, and pull all the way out. To insert or maneuver the multi-tool, lift the top of the tab and pull up or push down against the back-plate and silicone band.

Turning now to FIG. 17C, the second position allows the user to reveal the bottle opener on the top of the multi-tool. This is a "quick-draw" mechanism in case the user does not intend to take the multi-tool all the way out. Top do this, in the closed position, the user must lift the top of the multi-tool towards him/her, and pull up to engage the multi-tool against the chassis on the second row of tabs. To insert or maneuver the multi-tool, lift the top of the tab and pull up or push down into position against the back-plate and silicone band.

Figure 18:
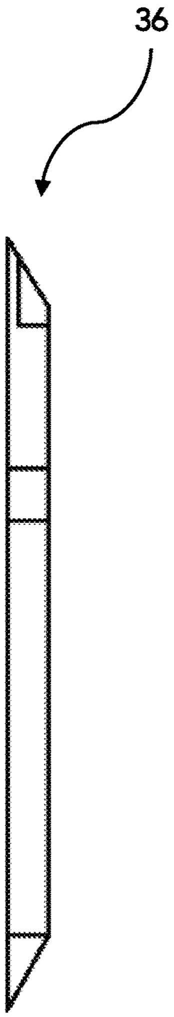
FIGS. 18-19 show exemplary side and front views of a second accessory that can be used with the wallet.
Figure 19:
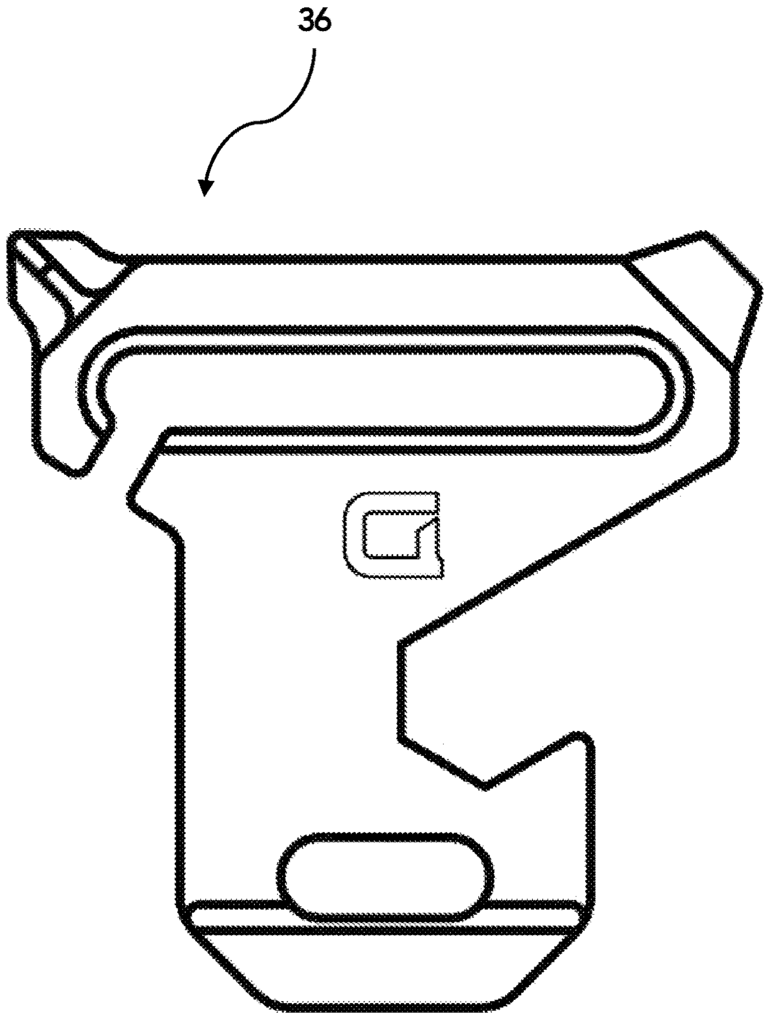

FIGS. 18-19 show exemplary side and front views of a second accessory, indicated by reference character 36 in FIGS. 18, 19, 21-23, and 31, that can be used with the wallet. This accessory fits in the bifold pocket as a miniature multi-tool device that includes five functions independent of the first accessory. The second accessory provides structures that provide functions including a small chisel, a hex wrench (such as a ¼" hex wrench), a bottle opener, a flat head and a Phillips head screw driver.

Figure 20:
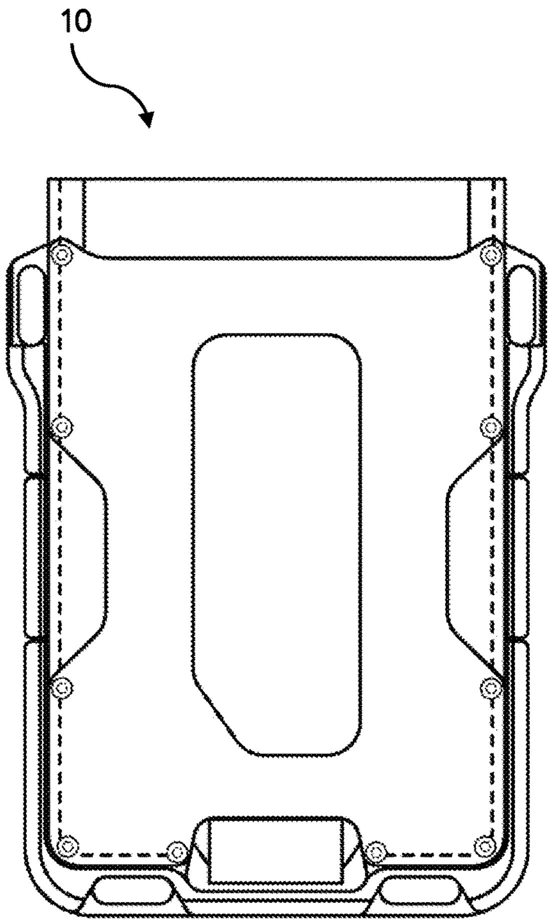
Figure 21:
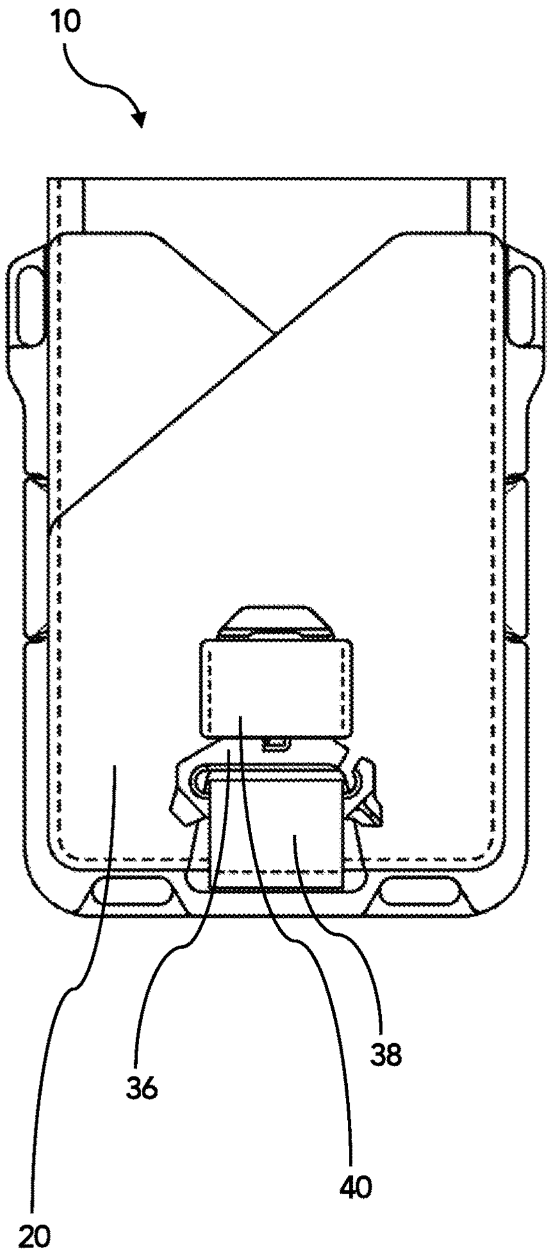
FIG. 21 shows a back view of this bifold embodiment in a closed position.
Figure 22:
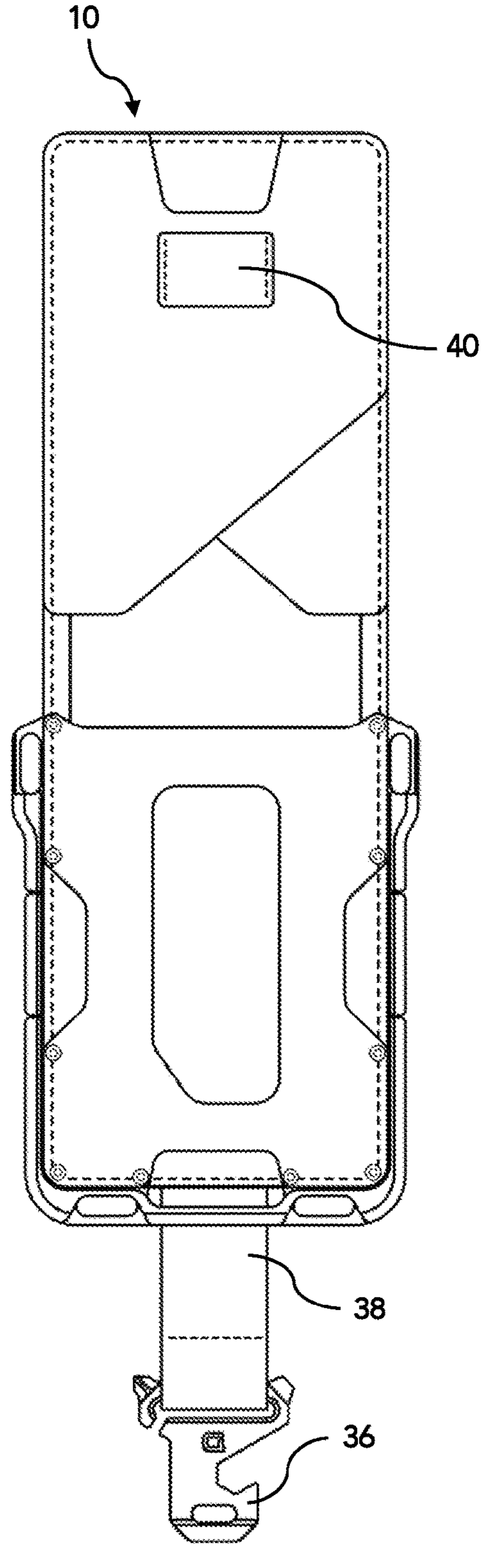
Figure 23:
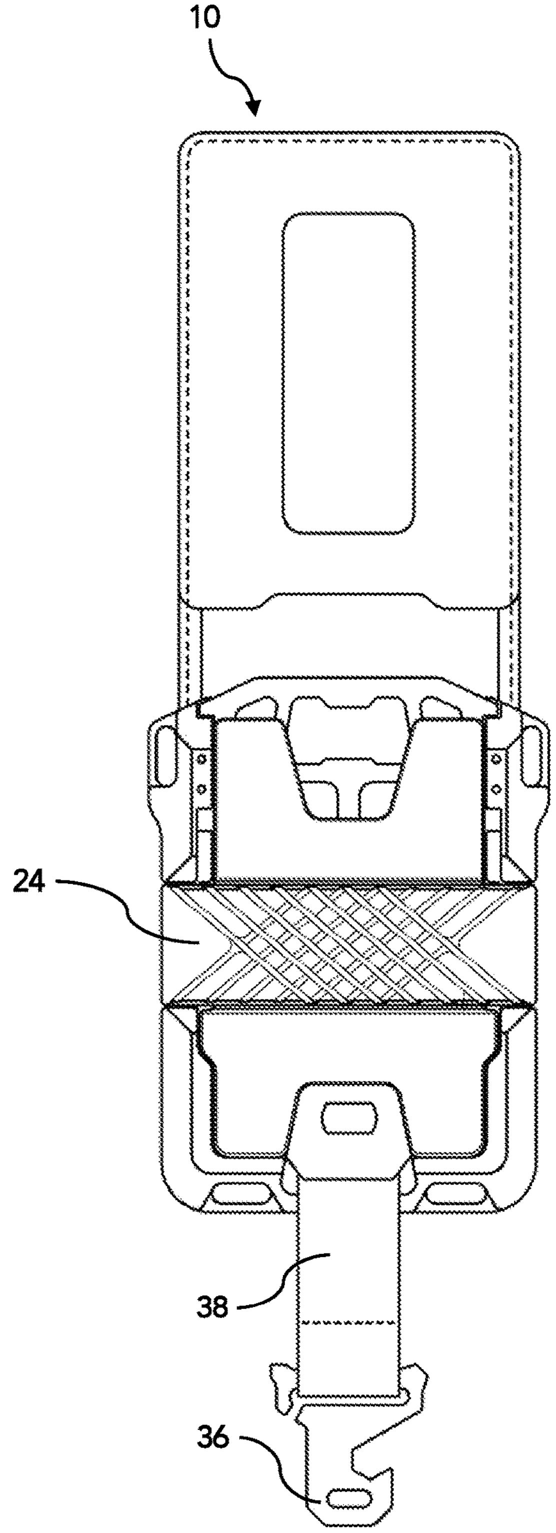
FIG. 23 shows a back view of the bifold embodiment in an open position.
Figure 24:
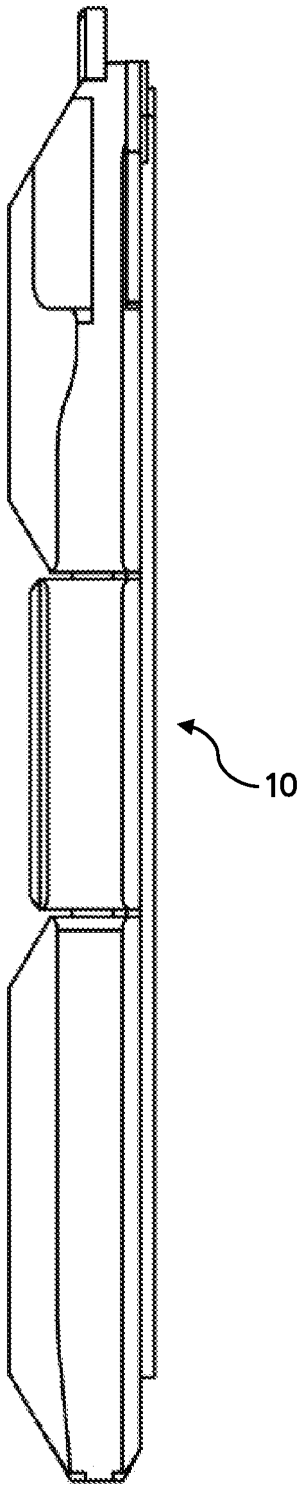
Figure 25:
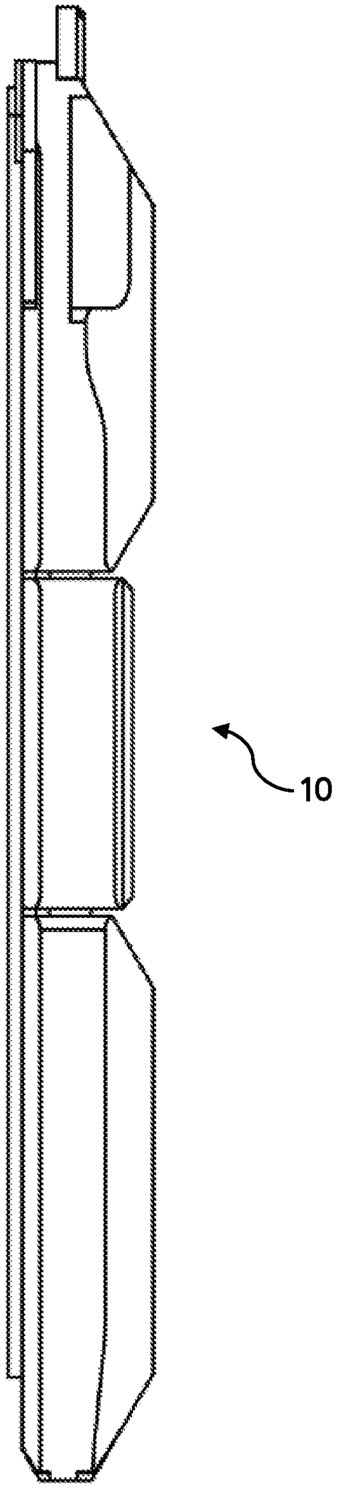
Figure 26:
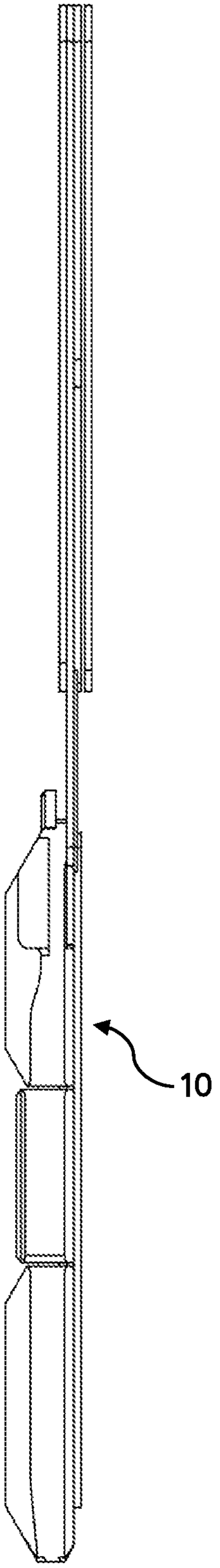
FIGS. 26-27 show the corresponding views in the open position.
Figure 27:
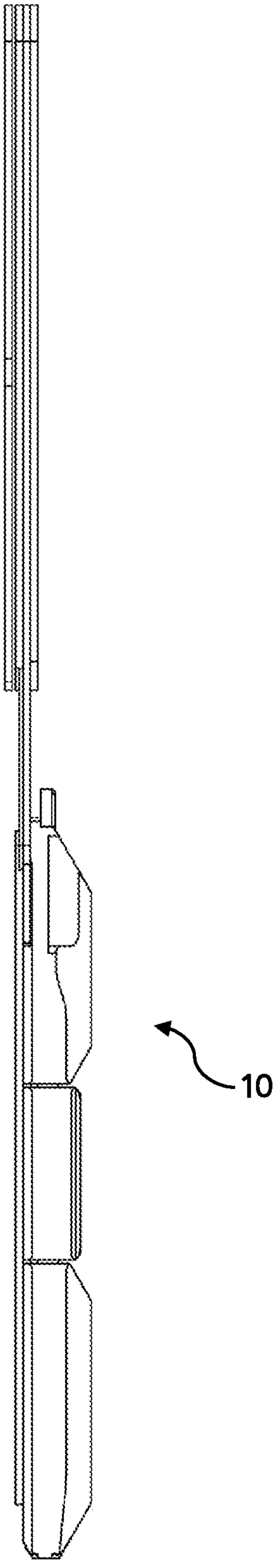
Figure 28:
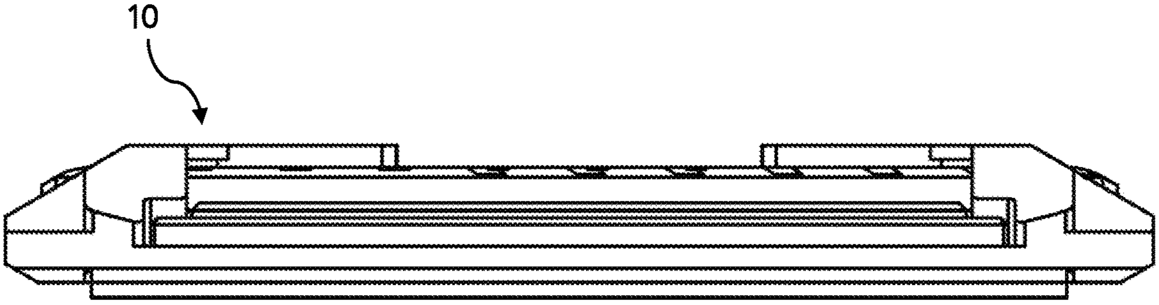
Figure 29:
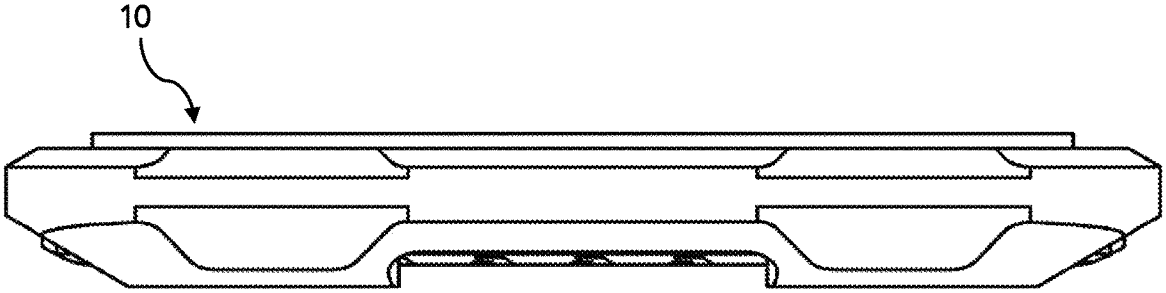
FIG. 29 shows a bottom view of the second bifold embodiment.

FIG. 20 shows a front view of the second bifold embodiment, while FIG. 21 shows a back view of this bifold embodiment in a closed position. FIG. 22 shows a front view of the bifold embodiment of FIG. 19, while FIG. 23 shows a back view of the bifold embodiment in an open position. FIGS. 24-25 show the left and right views of the second bifold embodiment in a closed position, while FIGS. 26-27 show the corresponding views in the open position. FIG. 28 shows a top view of the second bifold embodiment, while FIG. 29 shows a bottom view of the second bifold embodiment.

Figure 30:
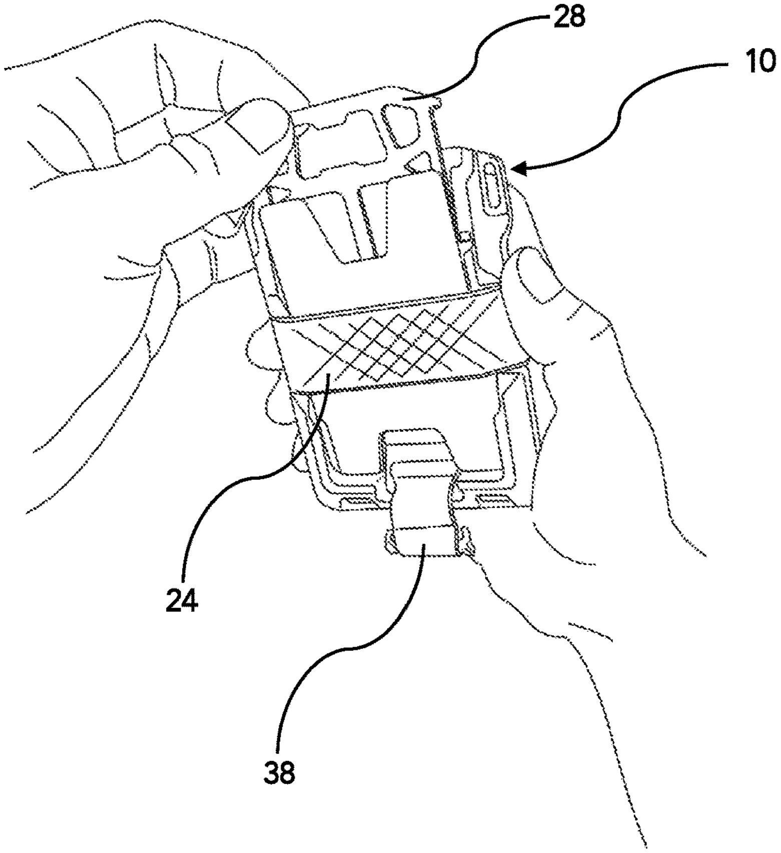
FIG. 30 illustrates the removal of the first accessory from the wallet to use the accessory.

FIG. 30 illustrates the removal of the first accessory from the wallet to use the accessory. During storage, the side tabs interlock with the wallet and cannot move. To remove the accessory or tool for use, the user pulls the accessory forward and pulls up to engage the side tabs with their designated nesting areas.

Figure 31:
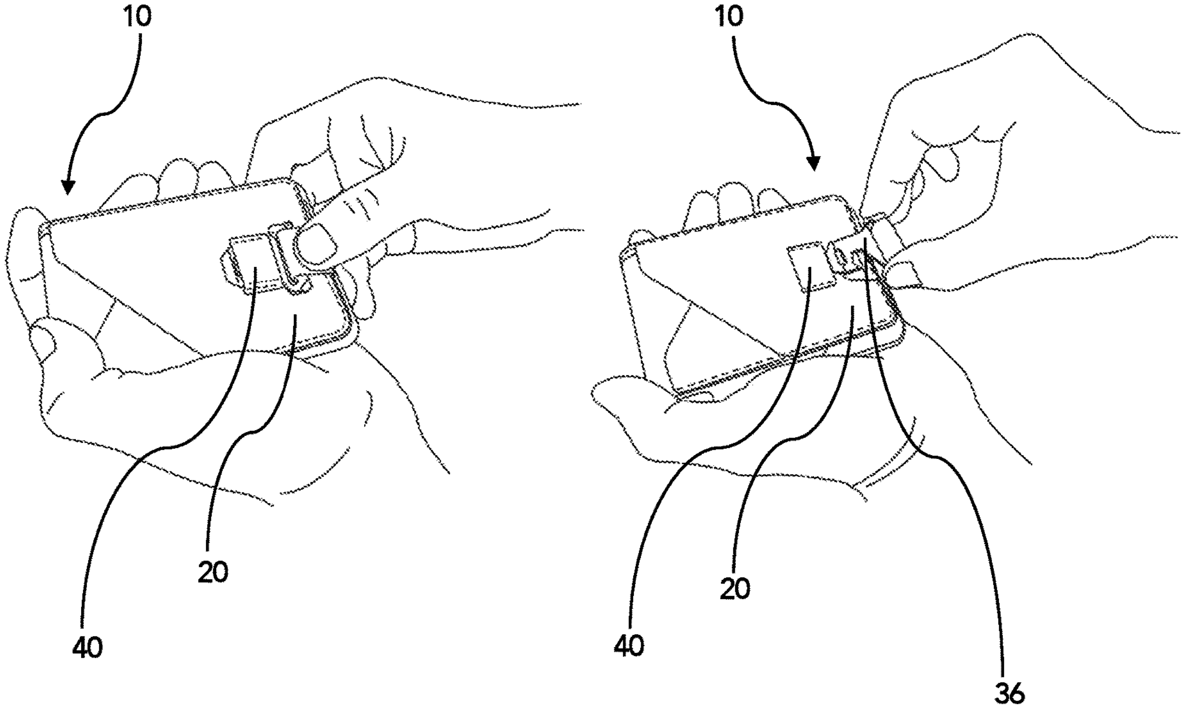
FIG. 31 illustrates the operation of the second accessory.
Figure 32:
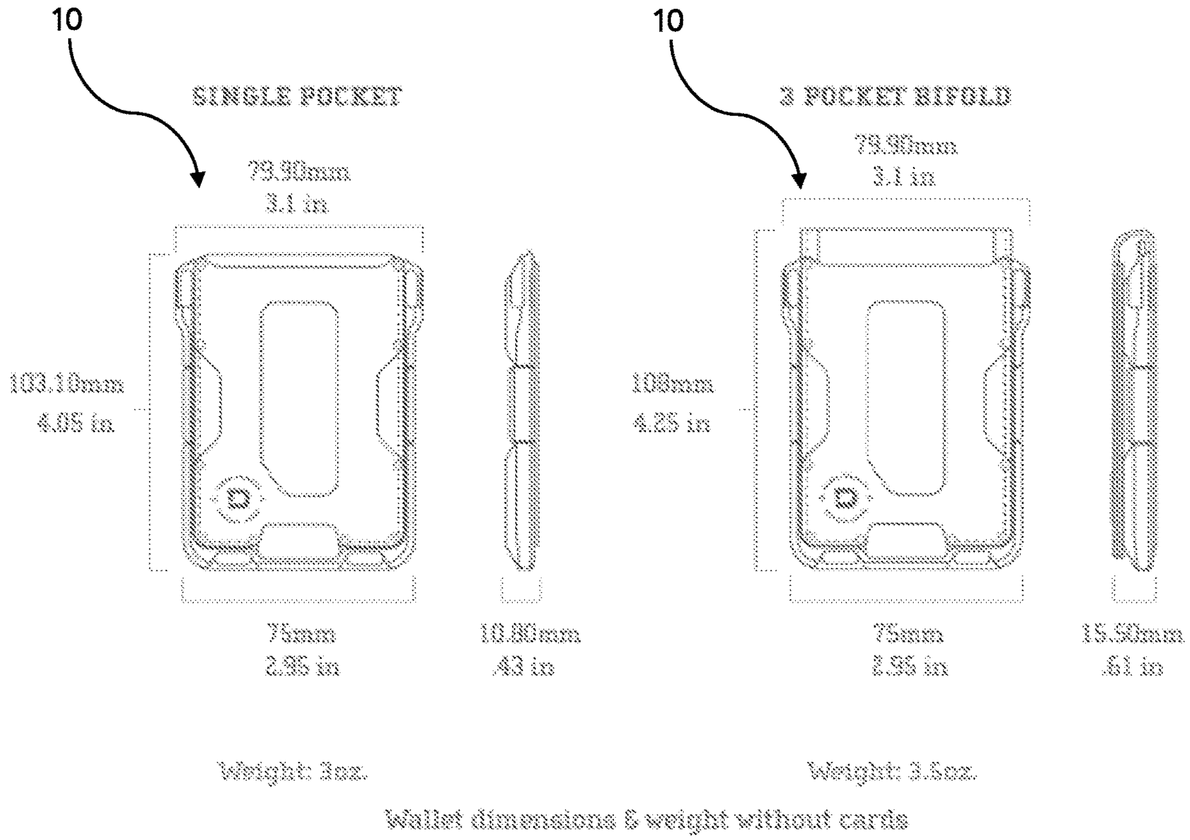
FIG. 32 shows exemplary dimensions and weights for two wallet embodiments.

FIG. 31 illustrates the operation of the second accessory. In one embodiment, the second accessory is attached to a nylon strap, indicated by reference character 38 in FIGS. 21-23 and 30, and is removable. A user can slide the second accessory in and out of a clasp pocket, indicated by reference character 40 in FIGS. 21 and 31, to open and close the bifold wallet. Once out of the clasp, the second accessory can be used as a small chisel, a hex wrench (such as a ¼" hex wrench), a bottle opener, a flat head or a Phillips head screw driver.

Inspired by military, first responders, and hardcore preppers, the M 1 Maverick Spec-Ops edition is a utility vertical wallet with a robust yet sleek design that is built for the rugged and tactical lifestyle. This wallet is the perfect companion for the everyday survivalist. The Ml Spec-Ops combines CNC Machined aluminum with a DTEX material; a fine mixture of an industrial "bullet-proof" chassis with a wallet skin that is resilient, flexible and water resistant. The surface of the Ml chassis is ceramic coated with a firearms industry standard ceramic paint tough enough to withstand rough handling. The Single Pocket variant comes with its pairing Multi-Tool which has over 10 functions which are specifically designed to respond to life threatening and emergency situations. The functions of the multi-tool include: a seat belt cutter, serrated/sharpened edges, chisel, 2 paracord tensioners, an 02 oxygen wrench, nail pryer, standard ¼" inch hex wrench, and of course, a bottle opener. The MT04 Multi-Tool slides into the metal cavity where the cards sit and is nested securely onto the safety locks on the chassis.

The wallet has a chassis, indicated by reference character 12 in FIGS. 1 and 9, that is made from CNC (Computer Numerical Control) machined metal (Aluminum/Stainless Steel/Titanium) to which a soft material, indicated by reference character 20 in FIGS. 8 and 10, can be attached with 10-11 stainless steel mil-spec bolts. CNC machining refers to a manufacturing process in which a block of metal is milled out to form a shape. On one side of the chassis, a metal pocket is milled out and enclosed by a separate CNC machined metal back plate. The metal chassis and backplate acts as an RFID blocking component (because of its metal properties) as well as a structural skeleton of the wallet while the attached soft material, usually textile or leather, serves as extra wallet pockets. Because the parts are modular, it allows us to release several version on the same foundation by plating or painting the metal chassis and changing the material, pattern or color of the pockets. We have our very own developed PU pocket called the DTEX material, which is a synthetic textured PU (Polyurethane) fabric made to feel like leather or cloth. The DTEX is stronger than leather and is an option if people want to waterproof their Dango wallet. The chassis is often plated by anodizing, ceramic coating, or processed in different manufacturing processes like tumbling or polishing to give the part a certain look and feel.

In addition to the assembly of the chassis and pockets, an injection molded silicone band surrounds the exterior of the wallet. Because of the silicone band's tensioning properties, it is used to hold or "sandwich" all components together including the separate metal backplate and the consumer's plastic or business cards. Moreover, the silicone band's properties allows the consumer to also hold extra cards or cash money. The band comes in several different colors, allowing the customer to personalize another component of the whole wallet. The texture of the wallet band is matte and plush to replicate a soft velvet feel. This texture is achieved by engraining it onto the injection molding tool before mass production. This texture is consistent on all of Dango Wallet bands and is often referred to as "soft-touch".

In various embodiments, the wallet may further comprise one or more spacers. The spacer may be configured to increase a thickness of the recess or cavity between top shell and bottom shell. The spacer may comprise a block, shim, leaf, grommet, gasket, washer, or the like, for example, located between the top shell and the bottom shell and through which fastener may pass. In various embodiments, the spacer may be disposed between the top shell and the bottom shell at the shell hinge. However, the spacer may be disposed at any portion of the wallet suitable for increasing a thickness of the recess between the top shell and bottom shell. In various embodiments, several spacers may be optionally inserted between the top shell and bottom shell so as to customize the thickness of the wallet's interior recess and, therefore, its capacity to accommodate a varying number of cards, bills, and the like. In various embodiments, a kit may comprise a wallet as described herein and one or more spacers of different thicknesses.

While top shell and the bottom shell have been described herein as possessing particular, respective features, it will be understood by those skilled in the art that the top shell may comprise any feature described in association with the bottom shell, and the bottom shell may comprise any feature described in association with the top shell.

The disclosure has described certain preferred embodiments and modifications thereto. Further modifications and alterations may occur to others upon reading and understanding the specification. Therefore, it is intended that the disclosure not be limited to the particular embodiment(s) disclosed as contemplated for carrying out this disclosure, but that the disclosure will include all embodiments falling within the scope of the invention as detailed in the claims.

While the invention has been particularly shown and described with reference to a preferred embodiment, it will be understood by those skilled in the art that various changes in form and detail may be made therein without departing from the spirit and scope of the invention.

What is claimed is:

1. A wallet, comprising:

a chassis including a cavity configured to receive at least one personal card, the cavity defined by a first wall, a second wall located opposite the first wall, and a bottom wall;

a soft material coupled to a back surface of the chassis, wherein the soft material comprises a first compartment to receive a personal effect selected from the group consisting of a personal card, a paper bill, and combinations thereof, wherein the soft material is configured to fold over a top portion of the chassis to thereby cover the cavity, wherein the top portion of the chassis is located opposite the bottom wall;

a band configured to wrap around the chassis to secure the personal effect selected from the group consisting of a personal card, a paper bill, and combinations thereof, thereto, wherein an outer surface of the band is substantially flush with an outer surface of the first wall, and the outer surface of the band is substantially flush with an outer surface of the second wall, such that the outer surface of the band, the outer surface of the first wall, and the outer surface of the second wall define at least a portion of an outer perimeter of the wallet;

a first exterior pocket; and a second exterior pocket, wherein the second exterior pocket is located opposite the chassis, the second exterior pocket comprising a plurality of clearance areas configured to receive a user's finger to thereby push the personal effect selected from the group consisting of a personal card, a paper bill, and combinations thereof, out of the second exterior pocket.

2. The wallet of claim 1, further comprising a plurality of openings located around a perimeter of the chassis, the plurality of openings adapted to clip one or more objects to the plurality of openings.

3. The wallet of claim 2, wherein the plurality of openings comprises four openings.

4. The wallet of claim 2, wherein the plurality of openings comprises:

a first opening located along the first wall adjacent the top portion of the chassis;

a second opening located along the second wall adjacent the top portion of the chassis;

a third opening located along the bottom wall adjacent the first wall; and a fourth opening located along the bottom wall adjacent the second wall.

5. The wallet of claim 1, wherein the band is located between the chassis and the soft material along the back surface.

6. The wallet of claim 1, further comprising a backplate coupled to the chassis, wherein the backplate is configured to hold the at least one personal card within the cavity.

7. The wallet of claim 6, wherein the backplate is configured to block at least one radio frequency identification (RFID) signal.

8. The wallet of claim 6, wherein the backplate is located between the band and the chassis.

9. The wallet of claim 8, wherein:

the first wall and the second wall each extend along a first direction, the bottom wall extends along a second direction perpendicular to the first direction, the band is configured to wrap around the chassis along the second direction, and the band is configured to extend along a third direction perpendicular to the first direction and the second direction to thereby secure at least one of the backplate and the personal effect selected from the group consisting of a personal card, a paper bill, and combinations thereof, to the chassis.

10. The wallet of claim 1, wherein the soft material comprises an interior pocket, the first exterior pocket, and the second exterior pocket, wherein the first exterior pocket is located opposite the interior pocket and the second exterior pocket is located opposite the chassis, and wherein each of the interior pocket, the first exterior pocket, and the second exterior pocket is configured to receive the personal effect selected from the group consisting of a personal card, a paper bill, and combinations thereof.

11. The wallet of claim 10, wherein the interior pocket includes a window configured to enable the user to view the personal effect selected from the group consisting of a personal card, a paper bill, and combinations thereof, located in the interior pocket.

12. The wallet of claim 1, further comprising a clasp pocket located on an exterior portion of the first exterior pocket, the clasp pocket configured to receive an accessory coupled to a strap.

13. The wallet of claim 12, wherein the strap is coupled to the chassis such that when the clasp pocket receives the accessory, the strap and the accessory secure the wallet in a closed position with the soft material covering the cavity.

14. The wallet of claim 12, wherein the accessory comprises a multi-tool.

15. The wallet of claim 1, wherein the plurality of clearance areas comprises four clearance areas.

16. The wallet of claim 15, wherein the plurality of clearance areas comprises a first clearance area located adjacent the first wall, the first clearance area configured to receive a user's finger to thereby push the personal effect selected from the group consisting of a personal card, a paper bill, and combinations thereof, out of the second exterior pocket.

17. The wallet of claim 16, wherein the plurality of clearance areas comprises a second clearance area located adjacent the second wall, the second clearance area configured to receive the user's finger to thereby push the personal effect selected from the group consisting of the personal card, the paper bill, and combinations thereof, out of the second exterior pocket.

18. The wallet of claim 17, wherein the plurality of clearance areas comprises a third clearance area located adjacent the bottom wall, the third clearance area configured to receive the user's finger to thereby push the personal effect selected from the group consisting of the personal card, the paper bill, and combinations thereof, out of the second exterior pocket.

19. The wallet of claim 18, wherein the plurality of clearance areas comprises a fourth clearance area located along a central portion of the second exterior pocket, wherein the fourth clearance area is located between the first clearance area, the second clearance area, and the third clearance area, the fourth clearance area configured to receive the user's finger to thereby push the personal effect selected from the group consisting of the personal card, the paper bill, and combinations thereof, out of the second exterior pocket.

20. The wallet of claim 19, wherein the fourth clearance area defines a window configured to enable the user to view the personal effect selected from the group consisting of a personal card, a paper bill, and combinations thereof, located in the second exterior pocket.

* * * * *